United States Patent
Kitagawa et al.

(10) Patent No.: US 7,314,229 B2
(45) Date of Patent: Jan. 1, 2008

(54) OCCUPANT RESTRICTION DEVICE

(75) Inventors: Yuuichi Kitagawa, Susono (JP); Yukisada Sunabashiri, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 448 days.

(21) Appl. No.: 10/981,711

(22) Filed: Nov. 5, 2004

(65) Prior Publication Data

US 2005/0098986 A1    May 12, 2005

(30) Foreign Application Priority Data

Nov. 11, 2003 (JP) .............................. 2003-381522

(51) Int. Cl.
*B60R 21/16* (2006.01)
(52) U.S. Cl. .................... 280/730.1; 280/752
(58) Field of Classification Search .......... 280/730.1, 280/752; 296/70
See application file for complete search history.

(56) References Cited

U.S. PATENT DOCUMENTS

| | | | | |
|---|---|---|---|---|
| 3,930,665 | A * | 1/1976 | Ikawa .................... | 280/751 |
| 4,194,762 | A * | 3/1980 | Sudo ..................... | 280/751 |
| 4,320,909 | A * | 3/1982 | Nakamori et al. ....... | 280/752 |
| 4,349,214 | A * | 9/1982 | Inasawa et al. ......... | 280/752 |
| 5,201,544 | A * | 4/1993 | Matano et al. .......... | 280/751 |
| 5,312,131 | A * | 5/1994 | Kitagawa et al. ....... | 280/730.2 |
| 5,927,755 | A  | 7/1999 | Matsuo et al. | |
| 6,145,880 | A * | 11/2000 | White et al. ............ | 280/752 |
| 6,390,503 | B2 * | 5/2002 | Muramatsu et al. ..... | 280/750 |
| 6,435,554 | B1 * | 8/2002 | Feldman ................ | 280/743.2 |
| 6,609,727 | B2 * | 8/2003 | Figlioli et al. .......... | 280/752 |

FOREIGN PATENT DOCUMENTS

| | | |
|---|---|---|
| JP | 10-217881 | 8/1998 |
| JP | 2001-106013 | 4/2001 |

* cited by examiner

*Primary Examiner*—Faye M. Fleming
(74) *Attorney, Agent, or Firm*—Global IP Counselors, LLP

(57) ABSTRACT

An occupant restriction device includes a shock absorbing body that is installed in a lower portion of a dashboard of a vehicle in front of an occupant's seat and arranged to be generally in front of left and right kneecaps of an occupant when the occupant sits on the occupant seat. The occupant restriction device is configured such that a rigidity of a transverse center portion of the shock absorbing body is higher than a rigidity of left and right side portions of the shock absorbing body. As a result, when the vehicle undergoes an offset collision or other collision in which the occupant's legs form a closed leg sitting posture, the highly rigid transverse center portion is configured to hold the occupant's kneecaps moderately open to prevent the occupant's legs from forming the closed leg sitting posture. Thus, the occupant restriction device can provide a stable shock alleviation effect.

7 Claims, 13 Drawing Sheets

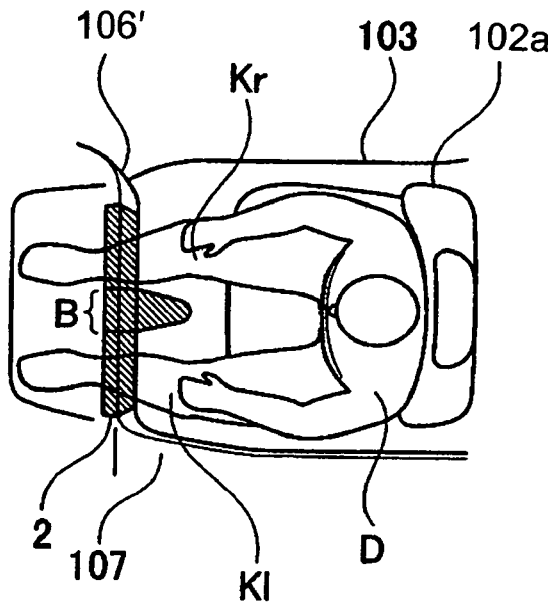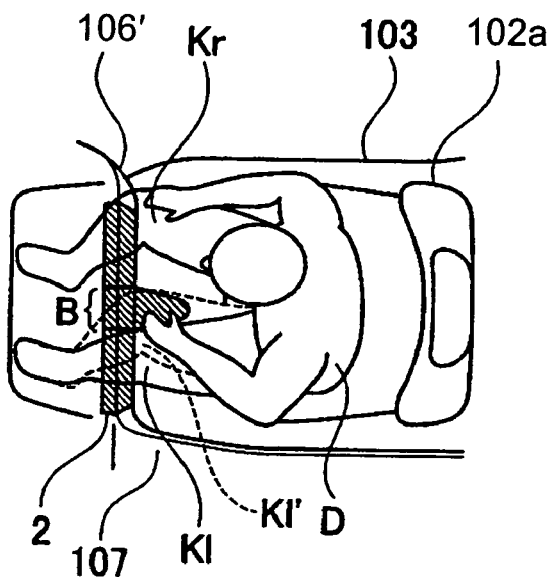
Fig. 7(a)   Fig. 7(b)
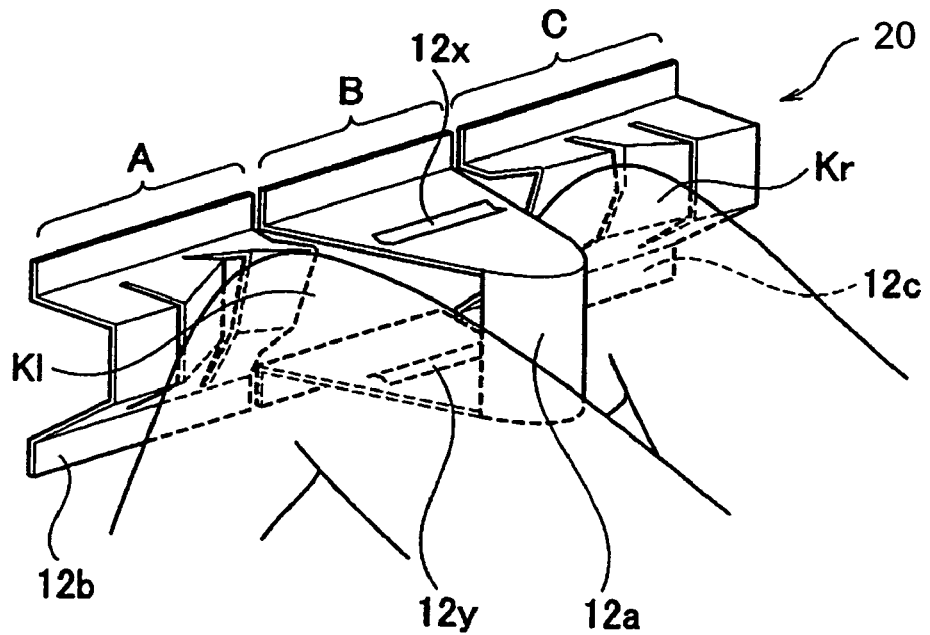
Fig. 7(c)

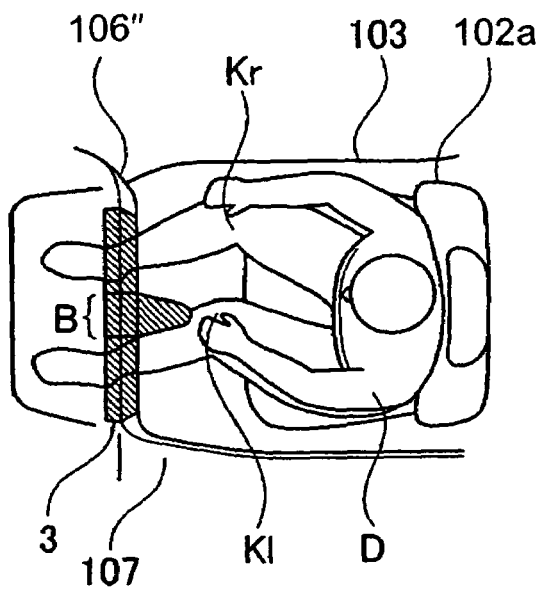
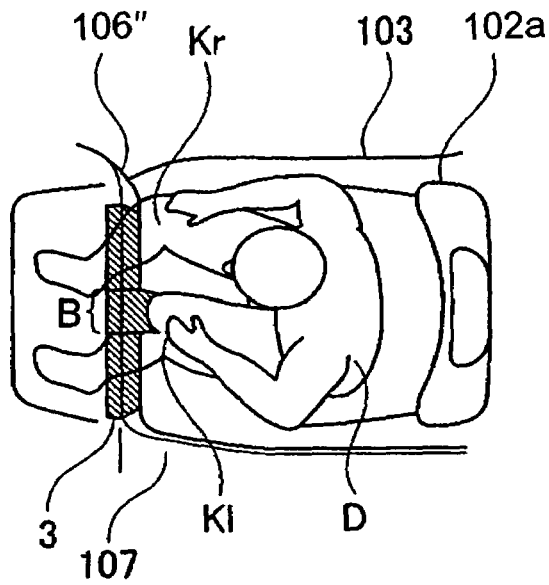
Fig. 11(a)  Fig. 11(b)
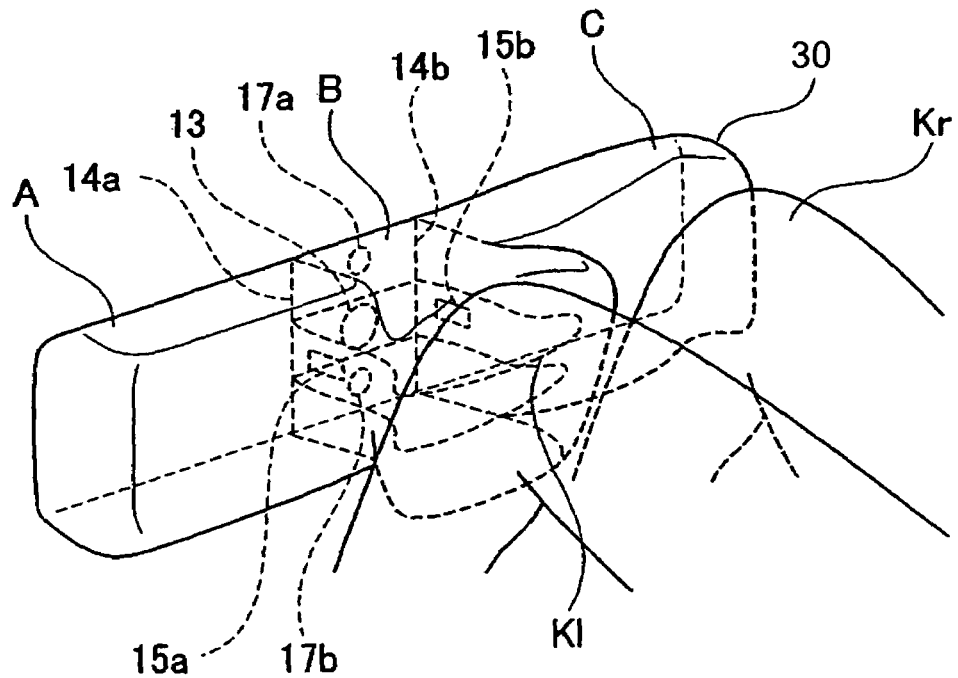
Fig. 11(c)

OCCUPANT RESTRICTION DEVICE

BACKGROUND OF THE INVENTION

1. Field of the Invention

The present invention relates to an occupant restriction device. More specifically, the present invention relates to an occupant restriction device that is disposed in a lower portion of a dashboard of a vehicle in front of an occupant seat for alleviating an impact force imparted to knees of an occupant sitting on the occupant seat during a collision of the vehicle.

2. Background Information

Japanese Laid-Open Patent Publication No. 10-217881 describes one example of a conventional occupant restriction device that comprises a knee protector made of thin sheet metal and installed in a dashboard of a vehicle in front of an occupant seat. More specifically, the knee protector disclosed in the above mentioned reference is inserted into the dashboard at a position approximately in front of left and right kneecaps of an occupant when the occupant sits on the occupant seat. With the knee protector of this conventional occupant restriction device, when the vehicle undergoes a front collision and the occupant moves forward due to inertia such that the occupant's kneecaps contact the dashboard, the knee protector is arranged to absorb impact energy to the occupant's kneecaps by deformably receiving the occupant's kneecaps.

Additionally, Japanese Laid-Open Patent Publication No. 2001-106013 describes another example of a conventional occupant restriction device having a pair of air bags each configured to deploy in a wedge shape between a dashboard and the left or right knee of an occupant. This conventional occupant restriction device prevents the kneecaps of the occupant from directly contacting the dashboard and the wedge shape of the air bags keeps the occupant's legs generally apart to disperse the loads acting on the occupant's femurs.

In view of the above, it will be apparent to those skilled in the art from this disclosure that there exists a need for an improved occupant restriction device. This invention addresses this need in the art as well as other needs, which will become apparent to those skilled in the art from this disclosure.

SUMMARY OF THE INVENTION

The conventional occupant restriction devices disclosed in the above mentioned references are configured to support the kneecaps of the occupant with the knee protector or the air bags when the occupant's kneecaps have moved forward after a collision. Thus, when the orientation or posture of the occupant's legs has changed during the collision, the desired effects of these conventional occupant restriction devices may not be obtained. For example, if a driver (occupant) performs operations of the vehicle intended to avoid a collision and thereby causes the orientation of the driver's legs to change, there is a possibility that the kneecaps of the driver will not move to the anticipated location. Thus, in the conventional occupant restriction devices, if the kneecaps of the driver do not move to the anticipated location, the knee protector or the air bags may not be able to support the kneecaps of the driver in an ideal manner.

Accordingly, one object of the present invention is to provide an occupant restriction device that can provide a stable effect of alleviating the impact energy of the occupant's kneecaps even when the occupant's kneecaps did not move toward expected locations.

In order to achieve the above mentioned and other objects of the present invention, an occupant restriction device is provided that comprises a left side shock absorbing portion, a right side shock absorbing portion, and a transverse center shock absorbing portion. The left side shock absorbing portion is configured and arranged to be installed inside a cabin of a vehicle to be disposed generally in front of a left kneecap of an occupant when the occupant sits on a front occupant seat. The right side shock absorbing portion is configured and arranged to be installed in inside the cabin of the vehicle to be disposed generally in the front of a right kneecap of the occupant when the occupant sits on the front occupant seat. The transverse center shock absorbing portion is disposed between the left and right side shock absorbing portions to form a shock absorbing body with the transverse center shock absorbing portion of the shock absorbing body having a higher rigidity than the left and right side portions in a transverse direction of the vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 7(a) is a diagrammatic top plan view of a driver sitting on a driver's seat of the vehicle equipped with the occupant restriction device in accordance with the second embodiment of the present invention before an offset collision of the vehicle;

FIG. 7(b) a diagrammatic top plan view of the driver sitting on the driver's seat of the vehicle equipped with the occupant restriction device in accordance with the second embodiment of the present invention after the offset collision of the vehicle;

FIG. 7(c) is a diagrammatic view illustrating deformation of a shock absorbing body of the occupant restriction device in accordance with the second embodiment of the present invention when left and right kneecaps of the driver hit the shock absorbing body during the offset collision;

FIG. 11(a) is a diagrammatic top plan view of a driver sitting on a driver's seat of the vehicle equipped with the occupant restriction device in accordance with the third embodiment of the present invention immediately after an offset collision of the vehicle when the driver's seat is adjusted rearwardly;

FIG. 11(b) a diagrammatic top plan view of the driver sitting on the driver's seat of the vehicle equipped with the occupant restriction device in accordance with the third embodiment of the present invention after a prescribed time has elapsed since the offset collision of the vehicle when the driver's seat is adjusted rearwardly;

FIG. 11(c) is a diagrammatic view illustrating deformation of a shock absorbing body of the occupant restriction device in accordance with the third embodiment of the present invention when left and right kneecaps of the driver hit the shock absorbing body during the offset collision after more time has elapsed since the prescribed amount of time elapsed when the driver's seat is adjusted rearwardly;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, an occupant restriction device 1 is illustrated in accordance with a first embodiment of the present invention. The occupant restriction device 1 of the present invention is configured and arranged to prevent occupant's legs from moving to an undesirable orientation or posture (e.g., a closed leg sitting posture) when the occupant's legs start to move in an undesirable direction before or during a collision. Thus, the occupant restriction device 1 of the present invention can effectively prevent an impact force being imparted to the occupant's kneecaps in undesirable manner even when the occupant's legs are not oriented toward expected positions during the collision.

Figure 1A:
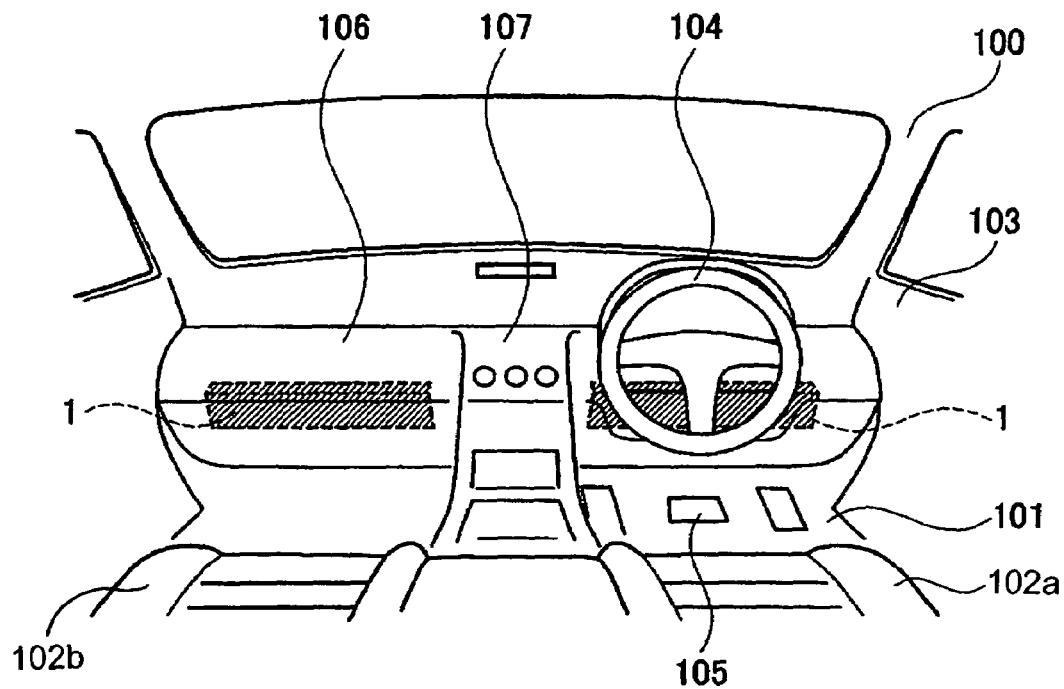
FIG. 1(a) is a diagrammatic view of an interior of a vehicle equipped with a pair of occupant restriction devices in accordance with a first embodiment of the present invention.
Figure 1B:
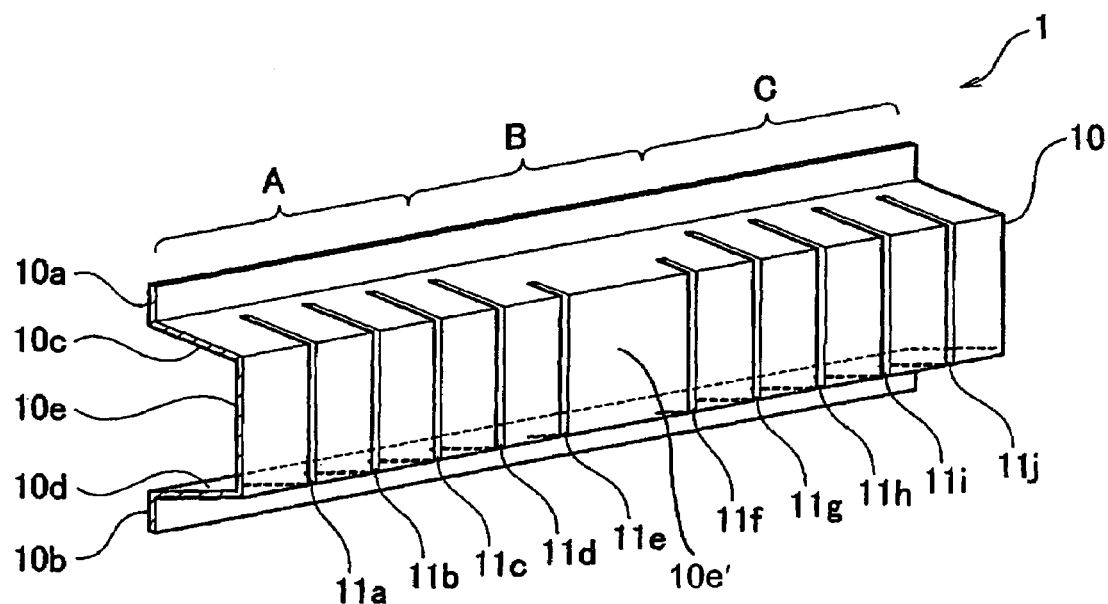
FIG. 1(b) is a perspective view of the occupant restriction device illustrated in FIG. 1(a) in accordance with the first embodiment of the present invention.

FIG. 1(a) is a diagrammatic view of an interior of a vehicle that is equipped with a pair of the occupant restriction devices 1 in accordance with the first embodiment of the present invention. FIG. 1(b) is a perspective view of the occupant restriction device 1. As shown in FIG. 1(a), a cabin space of the vehicle is formed by a vehicle body frame 100. A driver's seat 102a on which a driver sits and a passenger's seat 102b on which a passenger sits are mounted to a floor surface 101 of the cabin of the vehicle. A pair of left and right doors 103 for getting in and out of the vehicle are provided on a right side of the driver's seat 102a and a left side of the passenger's seat 102b.

As seen in FIG. 1(a), the driver's seat 102a is arranged in the right side in the cabin and a steering wheel 104 and a plurality of pedals 105 for controlling the behavior of the vehicle are provided in a front portion of the driver's seat 102a so that the driver who sits on the driver's seat 102a can operate the vehicle. A dashboard 106 that covers driving devices, air conditioning equipment, and other components is preferably arranged transversely in front of both the driver's seat 102a and the passenger's seat 102b.

An operating panel 107 for operating a navigation system, an air conditioning system, and the like is preferably arranged between the driver's seat 102a and the passenger's seat 102b. Furthermore, in the first embodiment of the present invention, the occupant restriction device 1 is preferably provided in front of each of the driver's seat 102a and the passenger's seat 102b. Thus, the occupant restriction devices 1 disposed in the dashboard 106 are configured and arranged to resiliently receive the driver's or passenger's kneecaps to absorb the impact energy imparted to the driver's or the passenger's kneecaps when the driver's or passenger's kneecaps contact the corresponding one of the occupant restriction devices 1 during a collision of the vehicle.

As seen in FIG. 1(b), each of the occupant restriction devices 1 preferably comprises a shock absorbing body 10 that is disposed in the lower portion of the dashboard 106 in front of the driver's seat 102a or the passenger's seat 102b. More specifically, the occupant restriction device 1 is preferably disposed in the dashboard 106 such that the shock absorbing body 10 is arranged in front of where the kneecaps of the driver or the passenger are located when the driver or the passenger sits on the driver's seat 102a or the passenger's seat 102b, respectively. The occupant restriction device 1 disposed in front of the passenger's seat 102b is substantially identical to the occupant restriction device 1 disposed in front of the driver's seat. Thus, only the occupant restriction device 1 on the driver's side is described in detail herein for the sake of brevity.

As shown in FIG. 1(b), the shock absorbing body 10 of the occupant restriction device is preferably made as a one-piece, unitary member by press-forming a thin sheet metal. The shock absorbing body 10 preferably has upper and lower flange portions 10a and 10b, upper and lower protruding plate members 10c and 10d, and a connecting plate member 10e.

More specifically, as seen in FIG. 1(b), the flange portions 10a and 10b are arranged at transverse upper and lower edges of the shock absorbing body 10 so that the upper and lower edges of the shock absorbing body 10 can be fixedly coupled to the vehicle body frame 100 inside the dashboard 106 with fasteners or welding. The upper and lower protruding plate members 10c and 10d are preferably arranged to protrude or extend toward inside the cabin (i.e., toward the driver's seat 102a or the passenger's seat 102b) from the upper and the lower flange portions 10a and 10b, respectively. The connecting plate member 10e preferably extends between end portions of the upper and lower protruding plate members 10c and 10d such that the upper and lower protruding plate members 10c and 10d and the connecting plate member 10e together form a substantially U-shape cross section as seen in FIG. 1(b). The connecting plate member 10e is arranged to form a contacting surface 10e that is disposed on one side of the connecting plate member 10e to face toward the driver's seat 102a so that the connecting plate member 10e can resiliently receive the kneecaps of the driver when the kneecaps move toward the shock absorbing body 10 in the forward direction of the vehicle.

As seen in FIG. 1(b), the upper and lower protruding plate members 10c and 10d and the connecting plate member 10e preferably have a plurality of slit-shaped cutout portions or slits 11a to 11j provided therein. Each of the slits 11a to 11j is formed so as to run uninterruptedly from the upper protruding plate member 10c, through the connecting plate member 10e, and to the lower protruding plate member 10d. The slits 11a to 11j are preferably disposed parallel to each other, and thus, the slits 11a to 11j are disposed not to intersect with each other.

More specifically, as seen in FIG. 1(b), the slits 11a to 11d are disposed in a left side shock absorbing portion or left side portion A of the shock absorbing body 10, the slits 11g to 11j are disposed in a right side shock absorbing portion or right side portion C of the shock absorbing body 10, and the slits 11e and 11f are disposed in a transverse center shock absorbing portion or transverse center portion B of the shock absorbing body 10. In the left side portion A and the right side portion B of the shock absorbing body 10, the slits 11a to 11d and the slits 11g to 11j, respectively, are formed to run uninterruptedly from a portion of the upper protruding plate member 10c near the upper flange portion 10a, through the connecting plate member 10e, and to a portion of the lower protruding plate member 10d near the lower flange portion 10b. On the other hand, the slits 11e and 11f in the transverse center portion B of the shock absorbing body 10 are preferably formed more shallowly than the other slits 11a to 11d and 11g to 11j. In other words, the slits 11e and 11f of the transverse center portion B are formed so as to run uninterruptedly from a portion of the upper protruding plate member 10c farther from the upper flange portion 10a, through the connecting plate member 10e, to a portion of the lower protruding plate member 10d farther from the lower flange portion 10b.

Moreover, the slits 11a to 11d in the left side portion A of the shock absorbing body 10 and the slits 11g to 11j in the right side portion C of the shock absorbing body 10 are preferably equally spaced apart by a first prescribed distance that is approximately equal to a size of a kneecap of an adult person having an average physical build (approximately 10 cm). On the other hand, the slits 11e and 11f in the transverse center portion B of the shock absorbing body 10 is preferably spaced apart from each other by a second prescribed distance that is longer than the first prescribed distance as seen in FIG. 1(b).

As a result, the slits 11a to 11d in the left side portion A and the slits 11g to 11j in the right side portion C of the shock absorbing body 10 are relatively deeper and more narrowly spaced than the slits 11e and 11f in the transverse center portion B of the shock absorbing body 10. Consequently, the left and right side portions A and C of the shock absorbing body 10 is configured and arranged to impact to provide a greater shock alleviation effect by deforming more readily than the transverse center portion B when the shock absorbing body 10 is subjected. In other words, since the slits 11e and 11f in the transverse center portion B are shallower and more widely spaced than the slits 11a to 11d in the left side portion A and the slits 11g to 11j in the right side portion C, the transverse center portion B is configured and arranged to deform less readily than the left and right side portions A and C when the shock absorbing body 10 is subjected to impact. Thus, the transverse center portion B of the shock absorbing body 10 has a higher rigidity than the left and right side portions A and C of the shock absorbing body 10.

Referring FIGS. 2(a) to 2(d), 3(a) to 3(d), 4(a) to 4(c) and 5(a) to 5(c), the operational effects of the occupant restriction device 1 will now be described. Here, the occupant restriction device 1 disposed in front of the driver's seat 102a is used to explain the operational effects of the occupant restriction device 1. Of course, it will be apparent to those skilled in the art from this disclosure that the operational effects of the occupant restriction device 1 that is disposed in front of the passenger's seat 102b are substantially identical to the operational effects of the occupant restriction device 1 disposed in front of the driver's seat 102a.

Figure 2A:
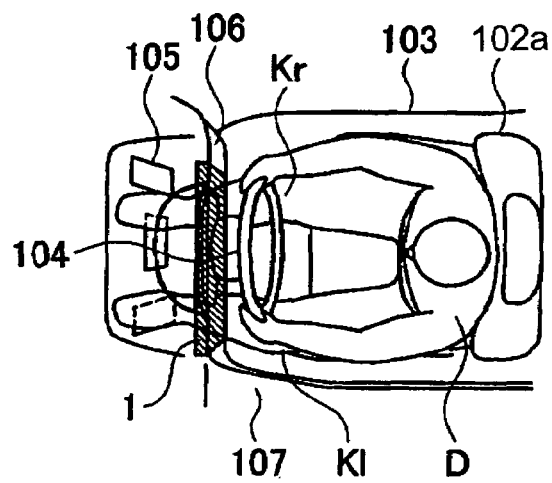
FIG. 2(a) is a diagrammatic top plan view of a driver sitting on a driver's seat of the vehicle equipped with the occupant restriction device in accordance with the first embodiment of the present invention before a collision of the vehicle.
Figure 2C:
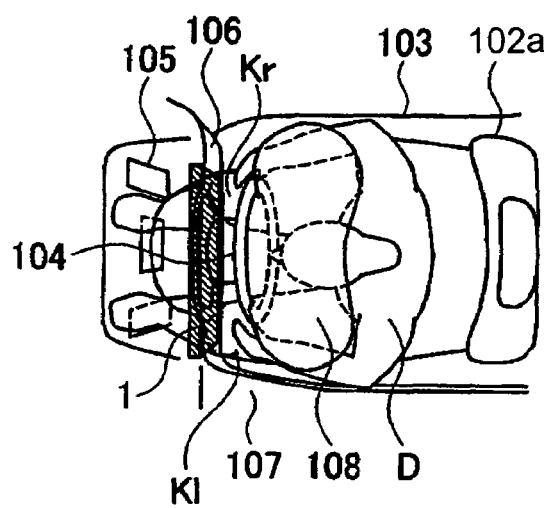
FIG. 2(c) is a diagrammatic top plan view of the driver sitting on the driver's seat of the vehicle equipped with the occupant restriction device in accordance with the first embodiment of the present invention after a front collision of the vehicle.
Figure 2B:
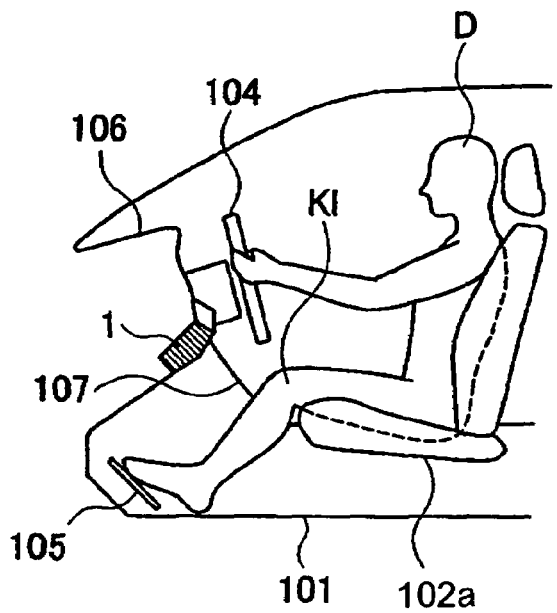
FIG. 2(b) is a diagrammatic side elevational view of the driver sitting on the driver's seat of the vehicle equipped with the occupant restriction device in accordance with the first embodiment of the present invention before the collision of the vehicle.
Figure 2D:
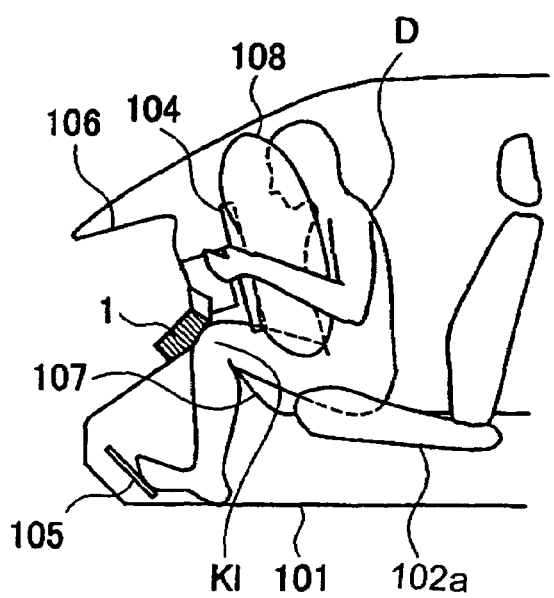
FIG. 2(d) is a diagrammatic side elevational view of the driver sitting on the driver's seat of the vehicle equipped with the occupant restriction device in accordance with the first embodiment of the present invention after the front collision of the vehicle.

FIGS. 2(a) to 2(d) are a series of diagrammatic views illustrating a behavior of a body of a driver D when the vehicle undergoes a front collision. More specifically, FIG. 2(a) is a top view showing a position or posture of the driver D sitting on the driver's seat 102a before the collision. FIG. 2(b) is a side view showing the posture of the driver D sitting on the driver's seat 102a before the collision. FIG. 2(c) is a top view showing the posture of the driver D after the front collision. FIG. 2(d) is a side view showing the posture of the driver D after the front collision.

As shown in FIGS. 2(a) and (b), when the driver D is sitting on the driver's seat 102a before the front collision, there is some space between the occupant restriction device 1 and left and right kneecaps Kl and Kr of the driver D. When a front collision occurs, the body of the driver D moves forward by inertia. If the speed of the vehicle is high at the time of the collision, an air bag 108 that is installed in the steering wheel 104 will be deployed for restraining an upper body of the driver D as shown in FIGS. 2(c) and 2(d). At the same time, the left and right kneecaps Kl and Kr of the driver D contact the lower portion of the dashboard 106 and apply impacts thereto. Since the occupant restriction device 1 is provided in the lower portion of the dashboard 106, the impacts of the left and right kneecaps Kl and Kr are absorbed by the occupant restriction device 1. More specifically, the occupant restriction device 1 is installed in the lower portion of the dashboard 106 so that the left and right kneecaps Kl and Kr of the driver D contact generally in the left and right side portions A and C of the shock absorbing body 10 in the front collision (i.e., when the left and right kneecaps Kl and Kr are moved substantially in a straight forward direction toward the dashboard 106 as seen in FIGS. 2(a) to 2(d)). Thus, the left and right side portions A and C resiliently receive the left and right kneecaps Kl and Kr by deforming as the left and right kneecaps Kl and Kr contact the dashboard 106.

Figure 3A:
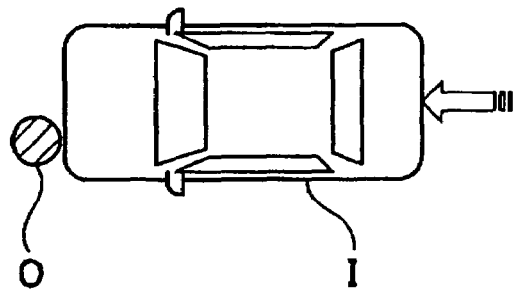
FIG. 3(a) is a diagrammatic top plan view of a vehicle showing a state before an offset collision.
Figure 3C:
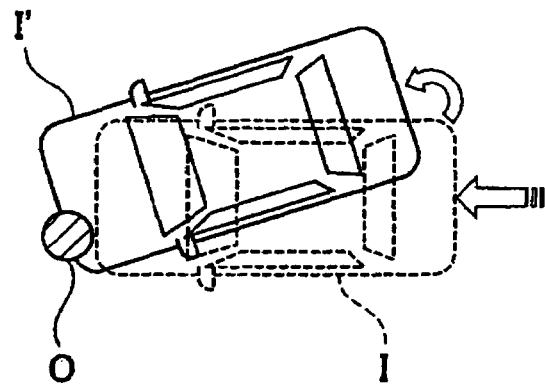
FIG. 3(c) is a diagrammatic top plan view showing a state after the offset collision.
Figure 3B:
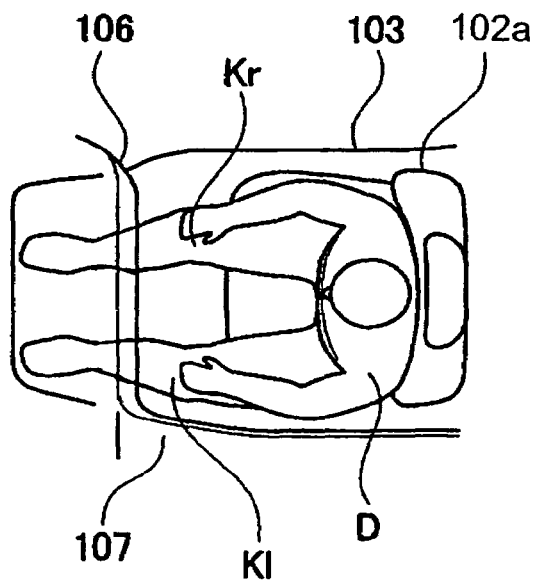
FIG. 3(b) is a diagrammatic top plan view of the driver sitting on the driver's seat of the vehicle that is not equipped with the occupant restriction device in accordance with the present invention before the offset collision of the vehicle.
Figure 3D:
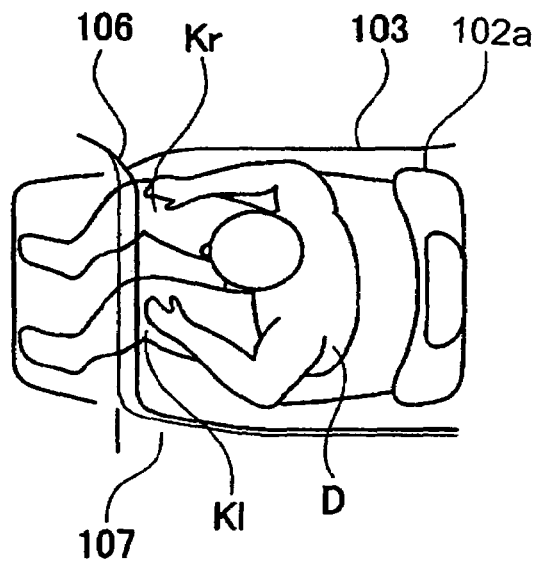
FIG. 3(d) is a diagrammatic top plan view of the driver sitting on the driver's seat of the vehicle that is not equipped with the occupant restriction device in accordance with the present invention after the offset collision of the vehicle.

However, when the vehicle undergoes an offset collision, the left and right kneecaps Kl and Kr of the driver D may not move to the expected locations (e.g., toward the left and right side portions A and C of the shock absorbing body 10). For example, FIGS. 3(a) to 3(d) are a series of diagrammatic views for explaining a behavior of the vehicle and a behavior of a body of the driver D in an offset collision when the occupant restriction device 1 is not installed in the vehicle. More specifically, FIG. 3(a) is a top plan view of the vehicle before the offset collision. FIG. 3(b) is a top view of a position or posture of the driver D sitting on the driver's seat 102a before the offset collision. FIG. 3(c) is a top plane view illustrating a movement of the vehicle after the offset collision. FIG. 3(d) is a top view of the posture of the driver D after the offset collision. In FIGS. 3(b) and 3(c), the steering wheel 104 and the pedals 105 are omitted for the sake of brevity.

When the vehicle is moving as shown in FIG. 3(a), the driver D is sitting on the driver's seat 102a with a normal posture (i.e., with the legs moderately open) as shown in FIG. 3(b). When one transverse side (left side in FIG. 3(c)) of the front of vehicle collides with a telephone pole or other such object O, the vehicle undergoes the offset collision. When viewed from above as shown in FIG. 3(c), the vehicle rotates in a counterclockwise direction from position I to position I' during the offset collision. As the vehicle rotates, the left and right kneecaps Kl and Kr of the driver D move toward right due to the rotation of the vehicle before the left and right kneecaps Kl and Kr contact the dashboard 106, as shown in FIG. 3(d).

In such case, if, for example, the right kneecap Kr of the driver D contacts the door 103 in addition to the dashboard 106, the right kneecap Kr will not move any farther to the right than the position where the right kneecap Kr contacts the door 103. However, the left kneecap Kl is not restricted by the door 103 or another object and continues to move toward the right kneecap Kr. Consequently, in the offset collision, the legs of the driver D tend to form a closed leg sitting posture.

Figure 4A:
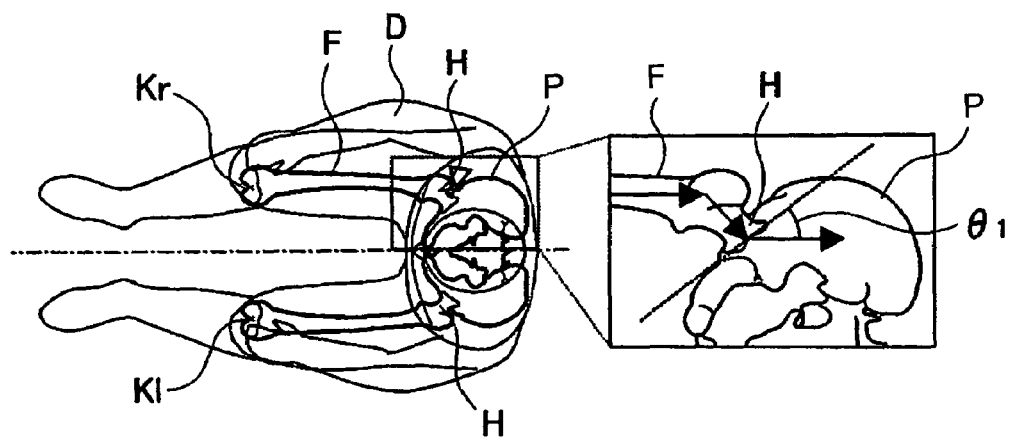
FIG. 4(a) is a diagrammatic view of a bone structure of a lower body of an occupant for explaining loads imparted to the occupant due to contact with a dashboard of the vehicle when the occupant is sitting with a normal sitting posture.
Figure 4B:
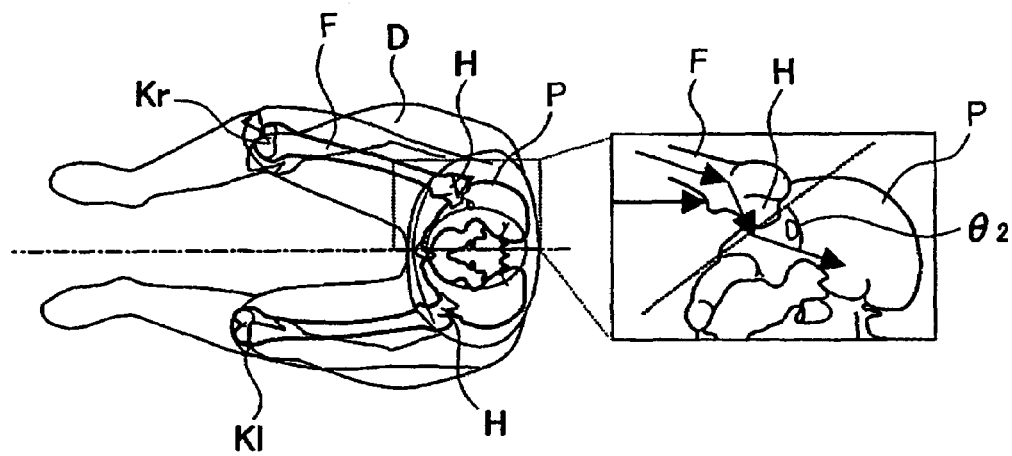
FIG. 4(b) is a diagrammatic view of a bone structure of the lower body of the occupant for explaining loads imparted to the occupant due to contact with the dashboard of the vehicle when the occupant is sitting with an open leg sitting posture.
Figure 4C:
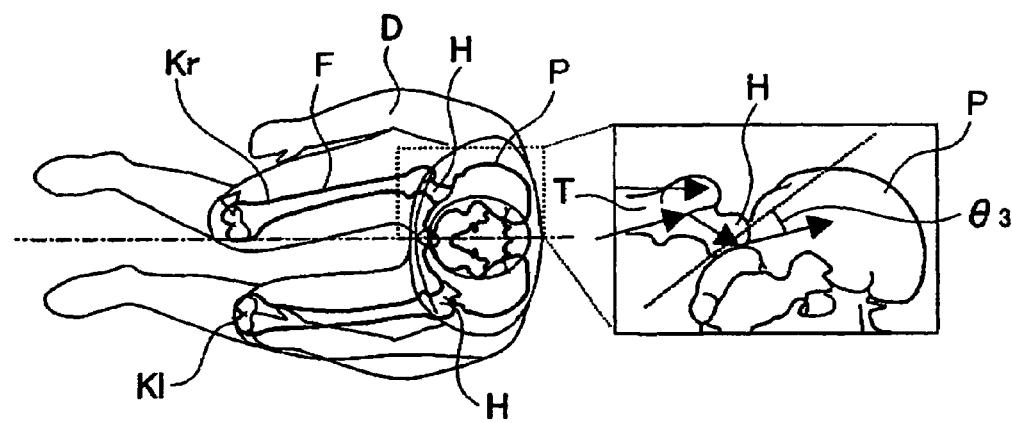
FIG. 4(c) is a diagrammatic view of a bone structure of the lower body of the occupant for explaining loads imparted to the occupant due to contact with the dashboard of the vehicle when the occupant is sitting with a closed leg sitting posture.

When the driver D is sitting with the closed leg sitting posture, the sensation that the driver D experiences during the collision is different from the sensation that the driver D experiences with the open leg sitting posture or the normal sitting posture. FIGS. 4(a) to 4(c) illustrate the loads imparted to the lower body of the driver D when a kneecap (e.g., the right kneecap Kr) of the driver D contacts with the dashboard 106. FIG. 4(a) is a diagrammatic view showing a bone structure of the lower body of the driver D for illustrating a case in which the driver D is sitting with the normal sitting posture with the legs moderately open. FIG. 4(b) is a diagrammatic view a diagrammatic view showing the bone structure of the lower body of the driver D for illustrating a case in which the driver D is sitting with the open leg sitting posture. FIG. 4(c) is a diagrammatic view showing the bone structure of the lower body of the driver D for illustrating a case in which the driver D is sitting with the closed leg posture (e.g., the right leg of the driver D is oriented toward the left leg). Only the loads imparted to the right leg will be described herein.

As shown in the FIGS. 4(a) to 4(c), the load imparted to the right kneecap Kr of the driver D is transmitted to a pelvis P through a femur F and a hip joint H. When the driver D is setting with the normal sitting posture as seen in FIG. 4(a), an angle $\theta 1$ is formed between the pelvis P and the femur F. When the driver D is setting with the open leg posture as seen in FIG. 4(b), an angle $\theta 2$ that is larger than the angle $\theta 1$ is formed between the pelvis P and the femur F. On the other hand, when the driver D is setting with the closed leg posture as seen in FIG. 4(c), an angle $\theta 3$ that is smaller than the angle $\theta 1$ is formed between the pelvis P and the femur F.

Generally, the shock is felt less intensely by the driver D when the load is directed toward the spine of the driver D and is felt more intensely when the load is directed away from the spine. Consequently, in view of the shock felt by the driver D, it is undesirable for an angle formed between the pelvis P and the femur F of the driver D to be small, as when the driver D is sitting with the closed leg sitting posture as shown in FIG. 4(c).

Thus, in general, when the offset collision causes the legs of an occupant to form the closed leg sitting posture as shown in FIG. 3(d), the occupant will feel a large load imparted to his body even if the conventional knee protector or the like is provided to support the kneecaps of the occupant. As a result, from the standpoint of protecting the occupant, the conventional knee protector or the like may not exhibit the desired effect. On the other hand, with the occupant restriction device 1 of the present invention, the desired effect of protecting the occupant can be achieved by preventing the occupant's legs to form the closed leg sitting posture.

Figure 5A:
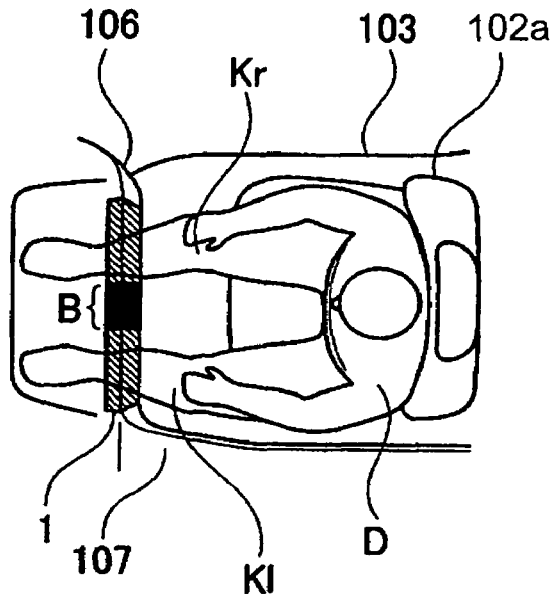
FIG. 5(a) is a diagrammatic top plan view of a driver sitting on a driver's seat of the vehicle equipped with the occupant restriction device in accordance with the first embodiment of the present invention before an offset collision of the vehicle.
Figure 5B:
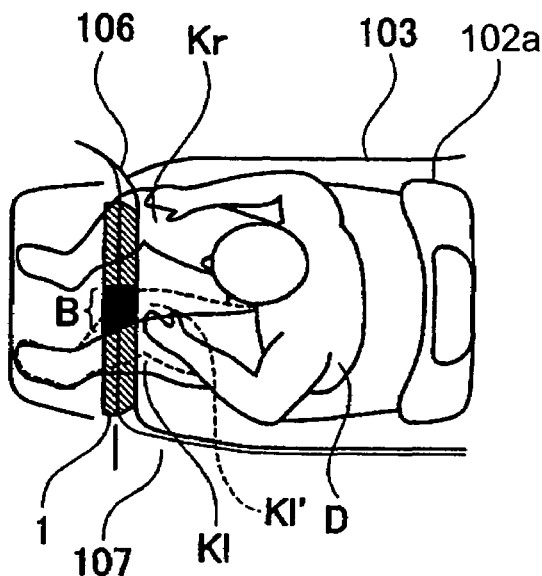
FIG. 5(b) is a diagrammatic top plan view of the driver sitting on the driver's seat of the vehicle equipped with the occupant restriction device in accordance with the first embodiment of the present invention after the offset collision of the vehicle.
Figure 5C:
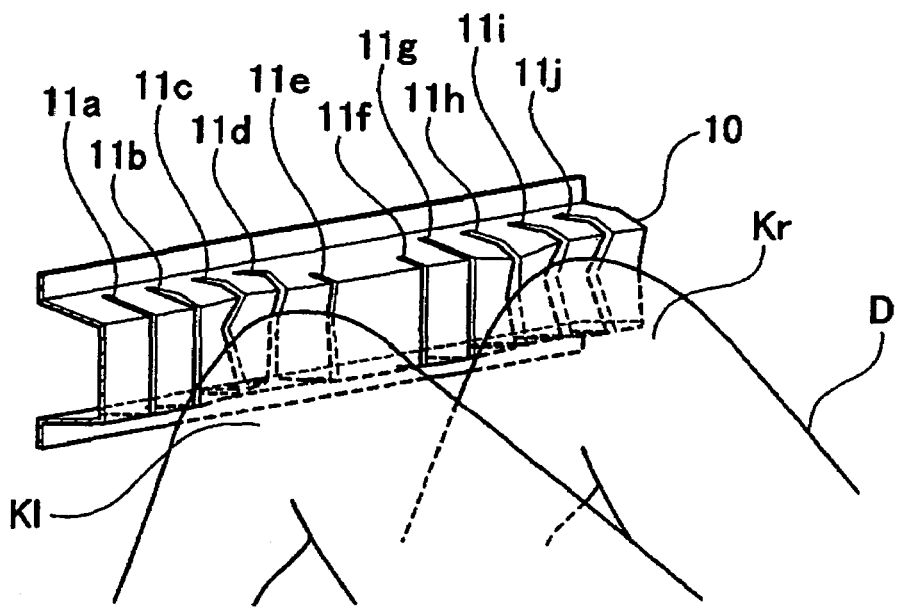
FIG. 5(c) is a diagrammatic view illustrating deformation of a shock absorbing body of the occupant restriction device in accordance with the first embodiment of the present invention when left and right kneecaps of the driver hit the shock absorbing body during the offset collision.

More specifically, FIGS. 5(a) to 5(c) illustrate the operation effects of the occupant restriction device 1 in accordance with the first embodiment when the legs of the driver D are moved to form the closed leg sitting posture during a collision such as the offset collision. FIG. 5(a) is a top plan view that shows a position of posture of the driver D and the occupant restriction device 1 before the offset collision. FIG. 5(b) is a top plan view that shows the posture of the driver D and the occupant restriction device 1 after the offset collision. FIG. 5(c) is a diagrammatic view illustrating deformation of the shock absorbing body 10 of the occupant restriction device 1 during the offset collision. FIGS. 5(b) and 5(c) illustrate an example of the offset collision in which the left side of the front of vehicle collides with an object O as seen in FIG. 3(c). In FIGS. 5(a) and 5(b), the steering wheels 104 and the pedals 5 are omitted for the sake of brevity.

As shown in FIG. 5(a), the driver D is sitting with the normal posture (i.e., with the legs moderately open) when the vehicle is moving. When the offset collision occurs, the left kneecap Kl of the driver D attempts to move toward right such that the legs of the driver D would form the closed leg sitting posture, as indicated by a broken line image Kl' of FIG. 5(b). However, as shown in FIG. 5(b), the occupant restriction device 1 of the first embodiment is provided with the transverse center portion B that is configured and arranged to prevent the position of the left kneecap Kl from approaching the right kneecap Kr and to keep the legs of the driver D moderately open.

The interaction between the left and right kneecaps Kl and Kr of the driver D and the shock absorbing body 10 of the occupant restriction device 1 will now be described in more detail with reference to FIG. 5(c). When the offset collision occurs, the left and right kneecaps Kl and Kr of the driver D hit the shock absorbing body 10. The right kneecap Kr hits approximately the right side portion C of the shock absorbing body 10 where the relatively deep and narrowly spaced slits 11g to 11j are formed. Thus, the shock absorbing body 10 is configured and arranged to deform easily and alleviate the impact force acting on the right kneecap Kr of the driver D. On the other hand, the left kneecap Kl of the driver D first hits approximately the left side portion A of the shock absorbing body 10 where, similarly to the right side portion C, the relatively deep and narrowly spaced slits 11a to 11d are formed. Thus, the shock absorbing body 10 is configured and arranged to deform easily and alleviate the impact force acting on the left kneecap Kl.

Then, due to the inertial force of the offset collision, the left kneecap Kl of the driver D attempts to move toward right. However, that rightward movement of the left kneecap Kl is restricted by the transverse center portion B of the shock absorbing body 10. As described previously, the slit 11e formed in the transverse center portion B is shallower than the slits 11a to 11d. Thus, a region of the transverse center portion B of the shock absorbing body 10 where the slit 11e is formed deforms relatively less easily than the left side portion A where the slits 11a to 11d are formed as seen in FIG. 5(c). Additionally, a middle region of the transverse center portion B does not have any slits, and thus, has a higher rigidity than other portions of the shock absorbing body 10. Consequently, the left kneecap Kl of the driver D does not move passed the transverse center portion B as indicated by the broken line Kl' shown in FIG. 5(b). Thus, the legs of the driver D are held moderately open as shown in FIG. 5(b).

Accordingly, when the left and right kneecaps Kl and Kr of the driver D move sideways as well as forward due to an offset collision or some other cause, the occupant restriction device 1 of the present invention is configured and arranged to effectively alleviate the impact force imparted to the left and right kneecaps Kl and Kr and prevent the legs of the driver D from forming the closed leg sitting posture. In short, in addition to reducing the impact of the left and right kneecaps Kl and Kr, the occupant restriction device 1 is configured and arranged to prevent the shock felt by the driver D from increasing.

Thus, with the occupant restriction device 1 in accordance with the first embodiment, since the transverse center portion B of the shock absorbing body 10 has a higher rigidity than the left and right side portions A and C, the displacement of the knees of the driver D in the transverse direction (left and right) can be effectively restricted even if the orientation of the legs of the driver D has changed. In other words, if the left and right kneecaps Kl and Kr of the driver D have moved to the right, the shock absorbing body 10 is configured and arranged to deformably receive the left and right kneecaps Kl and Kr and the transverse center portion B with the higher rigidity is configured and arranged to prevent the left kneecap Kl from moving close to the right kneecap Kr. Similarly, if the left and right kneecaps Kl and Kr of the driver D have moved to the left, the shock absorbing body 10 is configured and arranged to deformably receive the left and right kneecaps Kl and Kr and the transverse center portion B with the higher rigidity is configured and arranged to prevent the right kneecap Kr from moving close to the left kneecap Kl.

In this way, even the orientation of the legs of the driver D changes such that the kneecaps Kr and Kl do not move to the anticipated positions, the legs of the driver D can be prevented from drawing together into the closed leg sitting posture. Therefore, the physical shock felt by the driver D can be prevented from increasing. As a result, the occupant restriction device 1 of the present invention can provide a stable effect of protecting the occupant of the vehicle during a collision.

Additionally, since the shock absorbing body 10 of the occupant restriction device 1 is preferably made by pressforming a sheet metal, the occupant restriction device 1 can be manufactured using the same manufacturing equipment as is used to manufacture conventional knee bolsters.

Furthermore, since the rigidity of the shock absorbing body 10 is adjusted by forming the slits 11a to 11j into the sheet metal, the shock absorbing body 10 can be made light in weight and the rigidity of the shock absorbing body 10 can be adjusted inexpensively.

Second Embodiment

Referring now to FIGS. 6(a) to 6(c), 7(a) to 7(c), and 8(a) to 8(c), an occupant restriction device 2 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The occupant restriction device 2 in accordance with the second embodiment is similar to the occupant restriction device 1 in accordance with the first embodiment except that a transverse center portion B of a shock absorbing body 20 of the occupant restriction device 2 of the second embodiment is configured and arranged to protrude farther toward inside the vehicle cabin than the left and right side portions A and C.

Figure 6A:
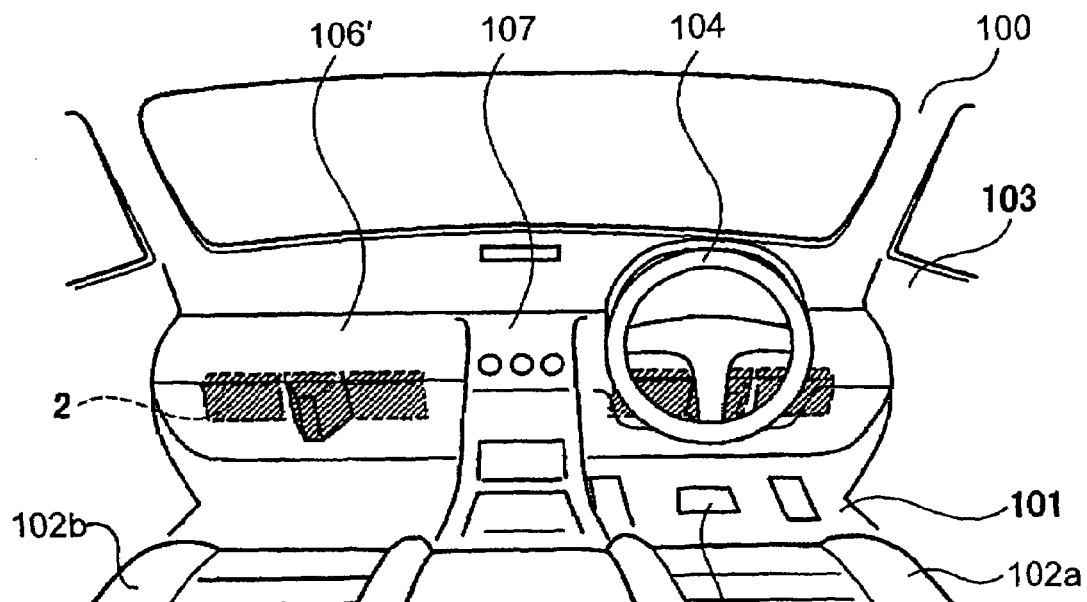
FIG. 6(a) is a diagrammatic view of an interior of a vehicle equipped with a pair of occupant restriction devices in accordance with a second embodiment of the present invention.
Figure 6B:
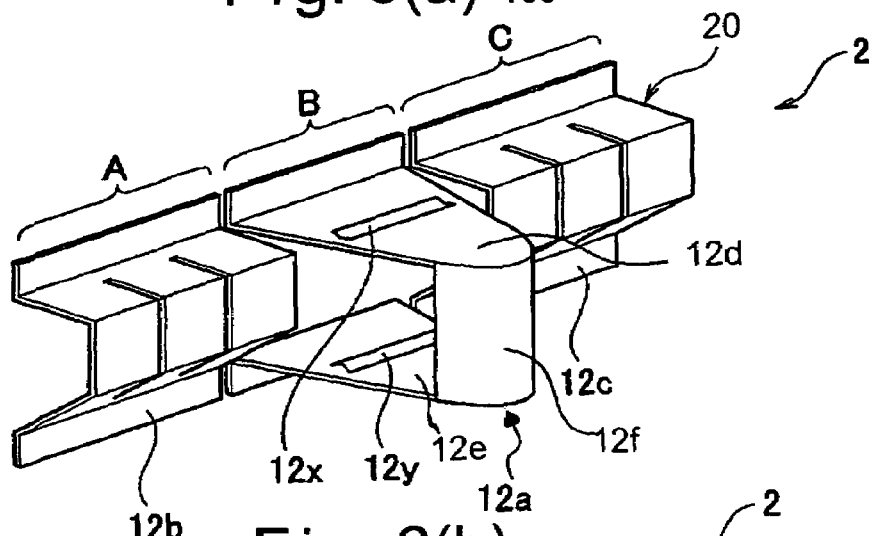
FIG. 6(b) is a perspective view of the occupant restriction device illustrated in FIG. 6(a) in accordance with the second embodiment of the present invention.
Figure 6C:
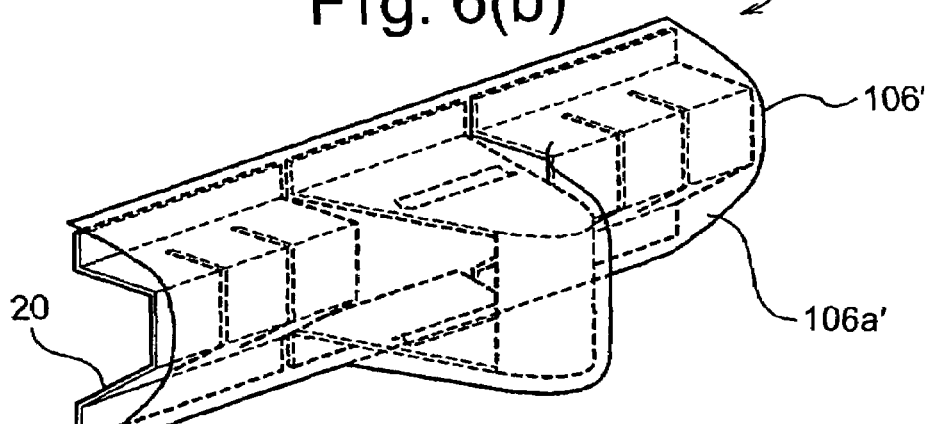
FIG. 6(c) is a perspective view of the occupant restriction device illustrated in FIGS. 6(a) and 6(b), but covered by a dashboard of the vehicle in accordance with the second embodiment of the present invention.

FIG. 6(a) is a diagrammatic view of an interior of a vehicle equipped with a pair of the occupant restriction devices 2. Similarly to the first embodiment explained above, the occupant protecting devices 2 are preferably installed in the lower portion of a dashboard 106' in front of the driver's seat 102a and the passenger's seat 102b of the vehicle. FIG. 6(b) is a perspective view of the shock absorbing body 20 of the occupant restriction device 2. FIG. 6(c) is a perspective schematic view of the occupant restriction device 2 installed inside the dashboard 106' covered by an outer resin 106a' of the dashboard 106'.

As shown in FIG. 6(a), similarly to the first embodiment, each of the occupant restriction devices 2 preferably comprises the shock absorbing body 20 arranged in the lower portion of the dashboard 106' in front of where the kneecaps of a driver who sits on the driver's seat 102a or a passenger who sits on the passenger's seat 102b are located. As shown in FIG. 6(b), the shock absorbing body 20 of the second embodiment is configured and arranged such that the transverse center portion B protrudes beyond the left and right side portions A and C.

More specifically, the shock absorbing body 20 of the second embodiment preferably comprises a center member 12a arranged in the transverse center portion B. As seen in FIG. 6(b), the center member 12a preferably has a generally wedge-shape when viewed from above. More specifically, the center member 12a preferably includes a pair of upper and lower wedge-shaped plate members 12d and 12e preferably made with sheet metal extending generally in a horizontal direction at upper and lower portions of the center member 12a. Also, the center member 12a preferably includes a connecting plate member 12f that is a generally parabolic sheet metal member connecting inner edge portions of the upper and lower wedge-shaped plate members 12d and 12e. The connecting plate member 12f and the upper and lower wedge-shaped members 12d and 12e preferably form an irregular U-shape cross section. Moreover, each of the upper and lower wedge-shaped plate members 12d and 12e preferably includes an embossment 12x or 12y, respectively, that runs in the transverse direction of the vehicle.

Moreover, the shock absorbing body 20 preferably includes left and right members 12b and 12c that are arranged on the left and right side of the center member 12a. In other words, the left and right members 12b and 12c are preferably disposed in the left and right side portions A and C, respectively. Similarly to the first embodiment, the left and right members 12b and 12c preferably form generally U-Shape cross sections and the left and right members 12b and 12c are preferably provided with a plurality of slits as seen in FIG. 6(c). Although the center member 12a and the left and right members 12b and 12c of the shock absorbing body 20 are illustrated as separate members herein, it will be apparent to those skilled in the art from this disclosure that the center member 12a and the left and right members 12b can also be arranged as a single, unitary member in which the transverse center portion B protrudes farther toward inside the cabin than the left and right side portions A and C.

Since the embossments 12x and 12y of the upper and lower wedge-shaped plate members 12d and 12e, respectively, run in the transverse direction of the vehicle, the transverse center portion B of the shock absorbing body 20 is configured and arranged to deform easily when subjected to a force in the longitudinal direction but not to deform easily when subjected to a force in the transverse direction. In the second embodiment of the present invention, the sizes of the embossments 12x and 12y (lengths, widths, depths and the like) are adjusted such that the rigidity of the transverse center portion B is lower than the rigidity of the left and right side portions A and C in the longitudinal direction and the rigidity of the transverse center portion B is higher than the rigidity of the left and right side portions A and C in the transverse direction. Similarly to the first embodiment, the slits provided in the left and right members 12b and 12c allow the left and right members 12b and 12c to exhibit the shock alleviating effect.

As shown in FIG. 6(c), the shock absorbing body 20 is installed behind the dashboard 106' and covered by the outer resin 106a' of the dashboard 106'. Consequently, the outer resin 106a' of the dashboard 106' is arranged to bulge out to substantially conform to the contour of the protruding transverse center portion B.

Referring now to FIGS. 7(a) to 7(c), the operation effects of the occupant restriction device 2 in accordance with the second embodiment will be explained. FIG. 7(a) is a top plan view illustrating the occupant restriction device 2 and a driver D sitting on the driver's seat 102a before an offset collision. FIG. 7(b) is a top plan view illustrating the occupant restriction device 2 and the driver D after the offset collision. FIG. 7(c) is a diagrammatic view illustrating deformation of the shock absorbing body 20 of the occupant restriction device 2 during the offset collision. FIGS. 7(a) to 7(c) illustrate an example of an offset collision in which the left side of the front of vehicle collides with on object O as seen in FIG. 3(c).

As shown in FIG. 7(a), the driver D is sitting with a normal sitting posture when the vehicle is moving. When the offset collision occurs, the left kneecap Kl of the driver D attempts to move toward right in such a manner that the legs of the driver D form the closed leg sitting posture as indicated by the broken line Kl' of FIG. 7(b). However, similarly to the first embodiment, the occupant restriction device 2 of the second embodiment is configured and arranged to prevent the position of the left kneecap Kl of the driver D from approaching the right kneecaps Kr of the driver D by providing the transverse center portion B in the shock absorbing body 20. Thus, the legs of the driver D can be kept moderately open even in the offset collision.

The interaction between the left and right kneecaps Kl and Kr of the driver D and the shock absorbing body 20 of the occupant restriction device 2 will now be described in more detail with reference to FIG. 7(c). When the offset collision occurs, the left and right kneecaps Kl and Kr of the driver D hit the shock absorbing body 20 at generally the left and right side portions A and C, respectively, of the shock absorbing body 20. Since the left and right members 12b and 12c disposed in the left and right side portions A and C include the plurality of slits as shown in FIG. 6(b), the left and right members 12b and 12c are configured and arranged to deform easily to alleviate the impact force imparted to the left and right kneecaps Kl and Kr of the driver D.

Due to the inertial force of the offset collision, the left and right kneecaps Kl and Kr of the driver D both attempt to move toward right. However, the movement of the left kneecap Kl toward right is restricted by the transverse center portion B of the shock absorbing body 20 that protrudes toward inside of the cabin. As described above, the center member 12a disposed in the transverse center portion B is preferably provided with the embossments 12x and 12y such that the rigidity of the transverse center portion B is higher than the rigidities of the left and right side portions A and C in the transverse direction and lower than the rigidities of the left and right side portions A and C in the longitudinal direction. Consequently, the left kneecap Kl of the driver D is supported firmly by the center member 12a disposed in the transverse center portion B of the shock absorbing body 20 and prevented from moving rightward.

Figure 8A:
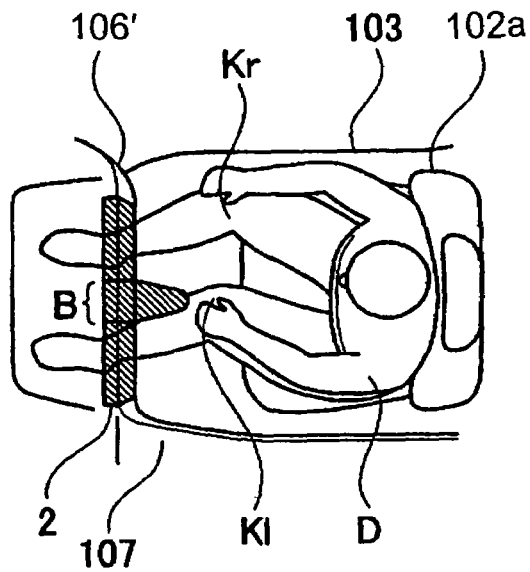
FIG. 8(a) is a diagrammatic top plan view of a driver sitting on a driver's seat of the vehicle equipped with the occupant restriction device in accordance with the second embodiment of the present invention before an offset collision of the vehicle when the driver's seat is adjusted rearwardly.
Figure 8B:
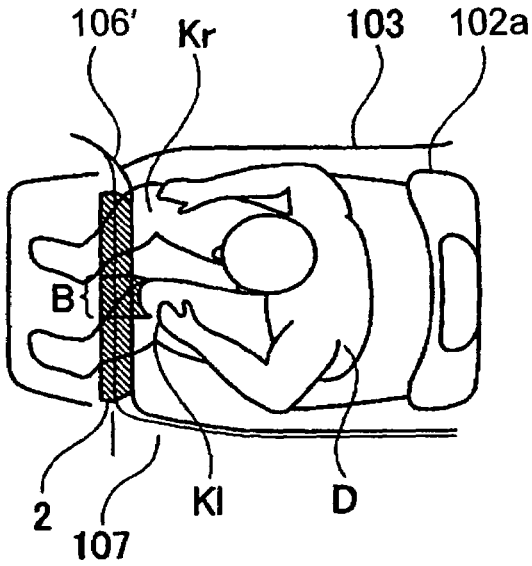
FIG. 8(b) a diagrammatic top plan view of the driver sitting on the driver's seat of the vehicle equipped with the occupant restriction device in accordance with the second embodiment of the present invention after the offset collision of the vehicle when the driver's seat is adjusted rearwardly.
Figure 8C:
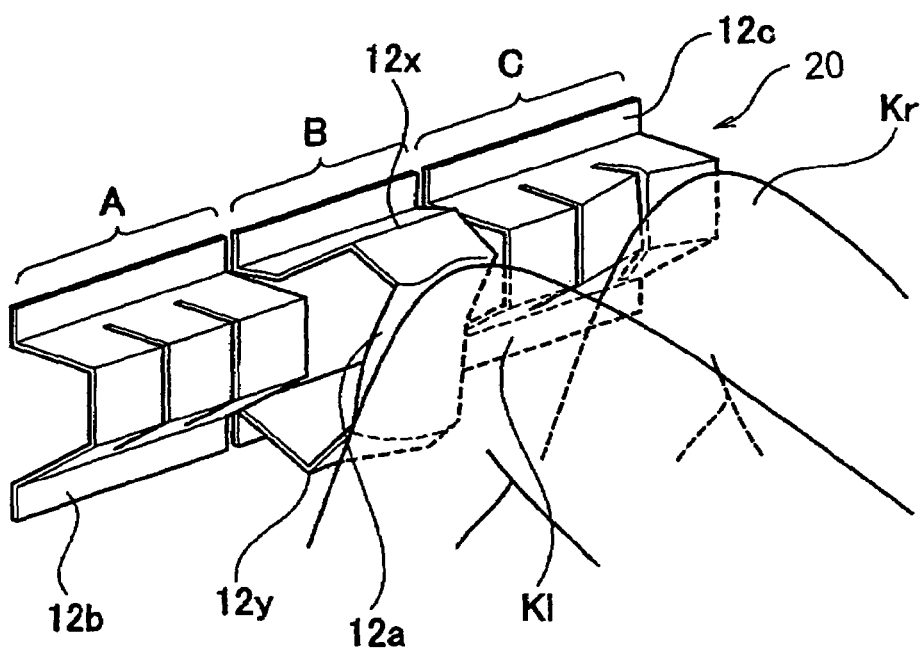
FIG. 8(c) is a diagrammatic view illustrating deformation of a shock absorbing body of the occupant restriction device in accordance with the second embodiment of the present invention when left and right kneecaps of the driver hit the shock absorbing body during the offset collision when the driver's seat is adjusted rearwardly.

Referring now to FIGS. 8(a) to 8(c), the operation effects of the occupant restriction device 2 in accordance with the second embodiment when the driver D shifted the driver's seat 102a rearwardly will be explained. In such case, there are more space between the occupant restriction device 2 and the left and right kneecaps Kl and Kr of the driver D before the collision. FIG. 8(a) is a top plan view illustrating the occupant restriction device 2 and a driver D sitting on the driver's seat 102a before an offset collision. FIG. 8(b) is a top plan view illustrating the occupant restriction device 2 and the driver D after the offset collision. FIG. 8(c) is a diagrammatic view illustrating deformation of the shock absorbing body 20 of the occupant restriction device 2 during the offset collision.

As shown in FIG. 8(a), the driver D is sitting with a normal sitting posture when the vehicle is moving. When the left side of the front portion of the vehicle collides with the object O as seen in FIG. 3(c), the inertial force of the offset collision causes the left and right kneecaps Kl and Kr of the driver D to attempt to move toward right. Since the driver's seat 102a is adjusted rearwardly and there is more space between the occupant restriction device 2 and the left and right kneecaps Kl and Kr of the driver D, the amount by which both kneecaps Kl and Kr move toward right is larger than in the case shown in FIGS. 7(a) to 7(c).

Consequently, as shown in FIG. 8(b), the left kneecap Kl of the driver D hits the center member 12a in the transverse center portion B. Thus, the sitting posture of the driver D becomes closer to the closed leg sitting posture than the case shown in FIGS. 7(a) to 7(c). The situation depicted in FIG. 8 is undesirable for the driver D and the shock felt by the driver D is larger than in the case shown in FIGS. 7(a) to 7(c). However, with the occupant restriction device 2 of the second embodiment of the present invention, the shock felt by the driver D is still substantially reduced comparing to the conventional occupant restriction device.

The interaction between the left and right kneecaps Kl and Kr of the driver D and the shock absorbing body 20 of the occupant restriction device 2 will now be described in more detail with reference to FIG. 8(c). First, the right kneecap Kr of the driver D hits the right member 12c disposed in the right side portion C of the shock absorbing body 20. Since the right member 12c is preferably provided with the plurality of slits, the right member 12c deforms readily and alleviates the impact force imparted to the right kneecap Kr of the driver D.

Due to the inertial force of the offset collision, the left kneecap Kl moves toward right and hits the center member 12a in the transverse center portion B. Since the center member 12a has the embossments 12x and 12y running in the transverse direction of the vehicle, the center member 12a is configured and arranged to deform in the longitudinal direction even more easily than the left and right members 12b and 12c in the left and right side portions A and C. Thus, the center member 12a is configured and arranged to receive the left kneecap Kl of the driver D even more softly or resiliently than the left and right members 12b and 12c. Thus, the center member 12a is configured and arranged to substantially reduce the shock felt by the driver D even when the sitting posture of the driver D is closer to the closed leg sitting posture.

When the rigidity of the center member 12a in the longitudinal direction of the vehicle is set to be relatively low, there is a concern that the left kneecap Kl might push through and contact the dashboard 106' without the impact being sufficiently alleviated. However, in the occupant restriction device 2 of the second embodiment, such an adverse situation does not occur because the center member 12a is configured and arranged to protrude toward inside the cabin so that the distance over which shock can be absorbed in the longitudinal direction is set to be relatively long.

Accordingly, with the occupant restriction device 2 of the second embodiment, in a case where the left kneecap Kl of the driver D hits the middle member 12a, the shock felt by the driver D can be substantially reduced even if the legs of the driver D are closer together than in the example shown in FIGS. 7(a) to 7(c). Thus, sufficient restriction of the occupant can be accomplished even when the left and right kneecaps Kl and Kr of the driver D do not move to the anticipated locations during the collision.

Similarly to the first embodiment, the occupant restriction device 2 in accordance with the second embodiment is configured and arranged to prevent the occupant from forming the closed leg sitting posture. Thus, the occupant restriction device 2 can deliver a stable effect of alleviating the impact to the kneecaps of the occupant. Additionally, the shock absorbing body 20 can be manufactured using the same manufacturing equipment as is used to manufacture conventional knee bolsters.

Furthermore, with the second embodiment of the present invention, since the transverse center portion B of the shock absorbing body 20 is arranged to protrude beyond the left and right side portions A and C, the transverse center portion B is configured and arranged to intervene more readily between the left and right kneecaps Kl and Kr of the driver D and can reliably restrict the lateral (transverse) movement of the left and right kneecaps Kl and Kr of the driver D. As a result, the legs of the driver D is easier to be kept in the open leg sitting posture.

The shock absorbing body 20 of the occupant restriction device 2 of the second embodiment is configured and arranged such that the transverse rigidity of the protruding transverse center portion B is larger than the transverse rigidities of the left and right side portions A and C, and the longitudinal rigidity of the protruding transverse center portion B is smaller than the longitudinal rigidities of the left and right side portions A and C. Since the longitudinal rigidity of the transverse center portion B is lower than the longitudinal rigidities of the left and right side portions A and C, the capacity of the transverse center portion B to absorb the shock resulting from being hit straight on in the forward direction of the vehicle is larger than that of the left and right side portions A and C. On the other hand, since the transverse rigidity of the transverse center portion B is higher than the transverse rigidities of the left and right side portions A and C, the transverse center portion B can hold the legs of the driver D moderately open in a favorable manner. Thus, while the occupant restriction device 2 of the second embodiment increases the effect of holding the legs of the driver D open, the occupant restriction device 2 can also receive the left or right kneecap Kl or Kr softly or resiliently in the event that one of the left and right kneecaps Kl and Kr hits the transverse center portion B. In short, the occupant can be protected in a favorable manner while increasing the effect of holding the legs of the occupant moderately open.

Moreover, since the rigidity of the transverse center portion B is adjusted by providing the embossments 12x and 12y in the center member 12a that is formed by sheet metal, the shock absorbing body 20 can be made light in weight and the rigidity of the shock absorbing body 20 can be adjusted inexpensively.

Third Embodiment

Referring now to FIGS. 9(a) to 9(c), 10(a) to 10(c), and 11(a) to 11(c), an occupant restriction device 3 in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity. The parts of the third embodiment that differ from the parts of the first or second embodiment will be indicated with a double prime (").

The occupant restriction device 3 in accordance with the third embodiment is similar to the occupant restriction device 2 in accordance with the second embodiment except that a shock absorbing body 30 of the third embodiment is formed with a bag-like body that is inflated or deployed with a gas during a collision.

Figure 9A:
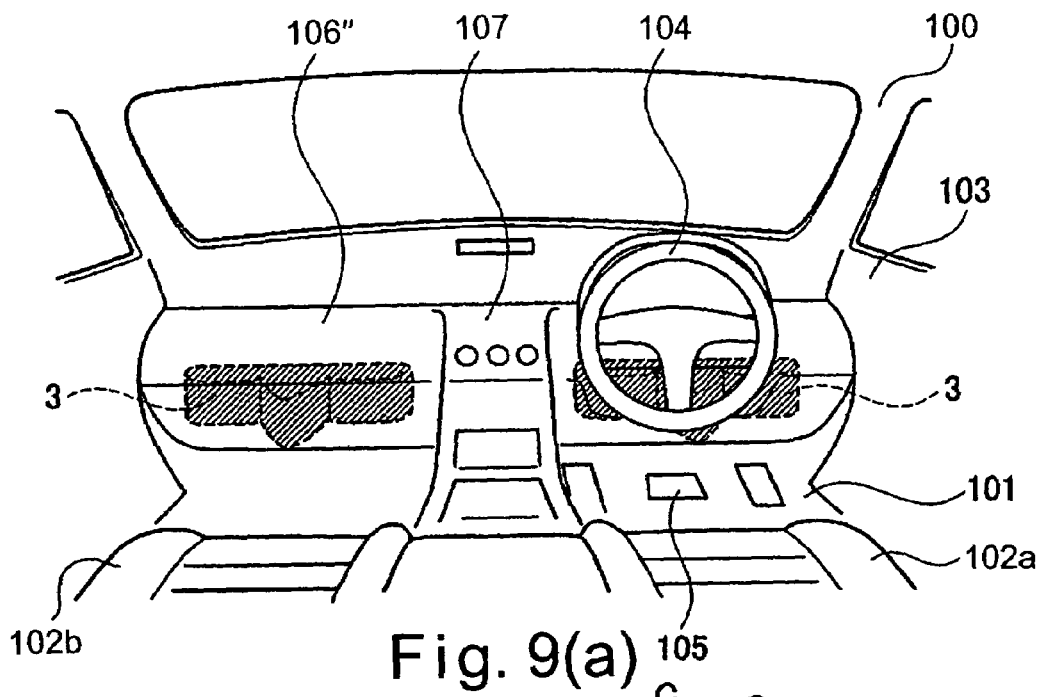
FIG. 9(a) is a diagrammatic view of an interior of a vehicle equipped with a pair of occupant restriction devices in accordance with a third embodiment of the present invention.
Figure 9B:
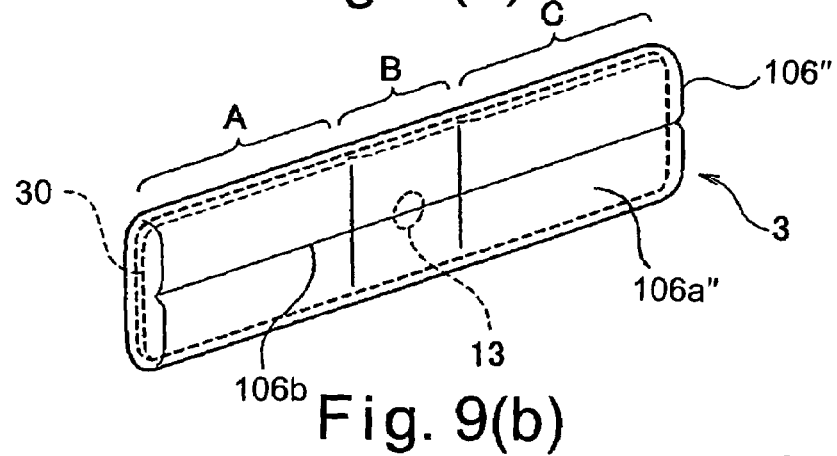
FIG. 9(b) is a perspective view of the occupant restriction device illustrated in FIG. 9(a), but covered by a dashboard of the vehicle in accordance with the third embodiment of the present invention when a shock absorbing body of the occupant restriction device is in a stored state.
Figure 9C:
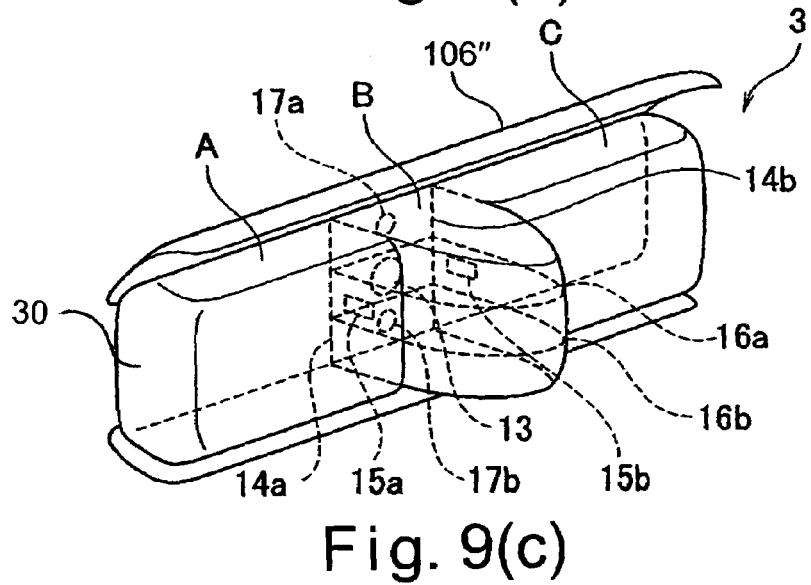
FIG. 9(c) is a perspective view of the occupant restriction device illustrated in FIGS. 9(a) and 9(b) in accordance with the third embodiment of the present invention when the shock absorbing body of the occupant restriction device is in a deployed state to protect an occupant during a collision of the vehicle.

FIG. 9(a) is a diagrammatic view an interior of a vehicle equipped with a pair of the occupant restriction devices 3 in accordance with the third embodiment of the present invention. FIG. 9(b) is a perspective view of the occupant restriction device 3 in a stored state. FIG. 9(c) is a perspective view of the occupant restriction device 3 in a deployed state illustrating when the shock absorbing body 30 is deployed when the occupant restriction device 3 is protecting an occupant.

As shown in FIG. 9(a), similarly to the second embodiment, each of the occupant restriction devices 3 comprises the shock absorbing body 30 arranged in the lower portion of a dashboard 106" in front of where the kneecaps of a driver sitting in the driver's seat 102a or a passenger sitting in the passenger seat 102b are located. However, the shock absorbing body 30 of the third embodiment is different from the shock absorbing body 20 of the second embodiment in that, as shown in FIGS. 9(b) and 9(c), the shock absorbing body 30 of the third embodiment is a bag-like or inflatable body configured and arranged to be inflated or deployed.

More specifically, the shock absorbing body 30 of the third embodiment preferably is arranged as an air bag elongated in the transverse direction of the vehicle. The shock absorbing body 30 is normally folded and covered with an outer resin 106a" of the dashboard 106" as seen in FIG. 9(b). An inflator 13 is preferably provided on the rear side of the shock absorbing body 30. The inflator 13 is configured and arranged to introduce a gas flow into the shock absorbing body 30 to inflate or deploy the shock absorbing body 30.

The dashboard 106" preferably includes a groove 106b provided in the front surface of the outer resin 106a". Thus, when the shock absorbing body 30 is deployed, the shock absorbing body 30 is configured and arranged to tear the groove 106b and pop out toward the driver on the driver's seat 102a or the passenger on the passenger seat 102b. In other words, the shock absorbing body 30 is configured and arranged to open the outer resin 106a" in upper and lower directions along the groove 12a to pop out. Once the shock absorbing body 30 has been inflated or deployed, the transverse center portion B of the shock absorbing body 30 is arranged to protrude toward inside the cabin beyond the left and right side portions A and C.

As shown in FIG. 9(c), the inflated or deployed shock absorbing body 30 preferably includes the left and right side portions A and C that are generally cuboid or rectangular parallelepiped. Moreover, the transverse center portion B of the shock absorbing body 30 is preferably arranged to protrude toward inside the cabin beyond the left and right side portions A and C. The shock absorbing body 30 preferably includes a pair of left and right partition membranes 14a and 14b between the transverse center portion B and the left side portion A, and between the transverse center portion B and the right side portion C. The left and right partition membranes 14a and 14b are preferably configured and arranged to generally separate the transverse center portion B from the left and right side portions A and C. The left and right partition membranes 14a and 14b are preferably provided with communication vents 15a and 15b, respectively, for fluidly coupling the transverse center portion B and the left and right side portions A and C. Thus, a single gas chamber is formed throughout the transverse center portion B and the left and right side portions A and C of the shock absorbing body 30.

The transverse center portion B of the shock absorbing body 30 preferably has a generally wedge-shape when viewed from above as seen in FIG. 9(c). Moreover, the transverse center portion B of the shock absorbing body 30 preferably includes a pair of horizontally oriented inner membranes 16a and 16b provided inside the transverse center portion B so that three air spaces (i.e., an upper level, a middle level and a lower level) are formed inside the transverse center portion B. The inner membranes 16a and 16b are preferably made of a mesh-like material so that a gas can freely flow into and out of the air spaces formed in the transverse center portion B. Thus, the inner membranes 16a and 16b do not obstruct the flow of gas between (into and out of) the left and right side portions A and C and the transverse center portion B.

The inner membranes 16a and 16b preferably serve as reinforcing membranes. More specifically, since the inner membranes 16a and 16b are provided in a horizontal orientation, the inner membranes 16a and 16b are configured and arranged to resist forces acting on the transverse center portion B in horizontal directions, and thus, act as reinforcing membranes against such forces. Thus, the inner membranes 16a and 16b are configured and arranged to increase the rigidity of the transverse center portion B.

Moreover, the transverse center portion B preferably includes a pair of upper and lower relief vents 17a and 17b in the upper and lower levels inside the transverse center portion B through which the gas put into the shock absorbing body 30 during inflation or deployment can escape. The upper and lower relief vents 17a and 17b are preferably provided in the rear surface of the transverse center portion B as seen in FIG. 9(c). Consequently, gas escapes easily when the transverse center portion B is depressed in the longitudinal direction of the vehicle but cannot escape easily when the transverse center portion B is depressed in the transverse direction of the vehicle. As a result, the rigidity of the transverse center portion B is configured and arranged to be relatively high in the transverse direction and relatively low in the longitudinal direction.

With the shock absorbing body 30 of the third embodiment, a gas is discharged from the inflator 13 and first introduced into the transverse center portion B when a collision occurs. The gas then flows through the left and right communication vents 15a and 15b into the left and right side portions A and C. Consequently, when the shock absorbing body 30 is inflated, first the transverse center portion B is deployed and then the left and right side portions A and C are deployed.

Then, when the left and right kneecaps Kl and Kr of an occupant hit the shock absorbing body 30 in a collision, the impact to the left and right kneecaps Kl and Kr is alleviated by the shock absorbing body 30. The force of the impact from the left and right kneecaps Kl and Kr depresses the shock absorbing body 30. Thus, the gas inside the shock absorbing body 30 is pushed out through the upper and lower relief vents 17a and 17b.

If the left and right kneecaps Kl and Kr of the occupant only hit the left and right side portions A and C, the gas will flow into the transverse center portion B from the left and right side portions A and C through the communication vents 15a and 15b, and then escape through the upper and lower relief vents 17a and 17b. In other words, the gas inside the left and right side portions A and C does not easily escape because the gas in the left or right side portion A or C must pass through both the communication vent 15a or 15b, and the upper or lower relief vent 17a or 17b.

On the other hand, if one of the left and right kneecaps Kl and Kr hits the transverse center portion B, the gas inside the transverse center portion B will escape directly from the upper and lower relief vents 17a and 17b. In such a case, since the gas inside the transverse center portion B only needs to pass through the upper and lower relief vents 17a and 17b, the gas inside the transverse center portion B escapes more easily than when the left and right kneecaps Kl and Kr hit the left and right side portions A and C. Moreover, when one of the left and right kneecaps Kl and Kr hits the transverse center portion B, since the one of the left and right kneecaps Kl and Kr depresses the transverse center portion B in the longitudinal direction of the vehicle, the gas inside the transverse center portion B escapes even more easily than when one of the left and right kneecaps Kl and Kr depresses the transverse center portion B in a transverse direction. Accordingly, the longitudinal rigidity of the transverse center portion B is arranged to be relatively lower than the longitudinal rigidity of the left and right side portions A and C.

Now consider a case in which the left and right side portions A and C of the shock absorbing body 30 are depressed in transverse directions (toward the transverse center portion B). Since the communication vents 15a and 15b are provided in the partition membranes 14a and 14b between the left and right side portions A and C and the transverse center portion B, the gas flows easily into the transverse center portion B. Thus, when the left and right side portions A and C are depressed toward the transverse center portion B, the left and right side portions A and C are configured and arranged to deform easily. In other words, the left and right side portions A and C are configured and arranged to have a lower rigidity in the transverse direction of the vehicle than the transverse center portion B. Therefore, the transverse center portion B has a higher transverse rigidity than the left and right side portions A and C.

Figure 10A:
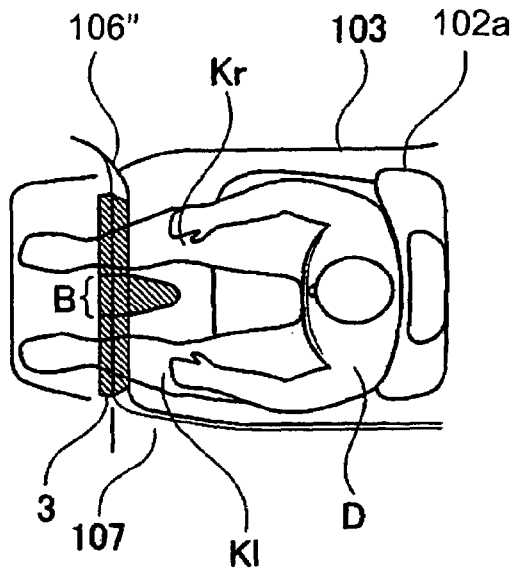
FIG. 10(a) is a diagrammatic top plan view of a driver sitting on a driver's seat of the vehicle equipped with the occupant restriction device in accordance with the third embodiment of the present invention immediately after an offset collision of the vehicle.
Figure 10B:
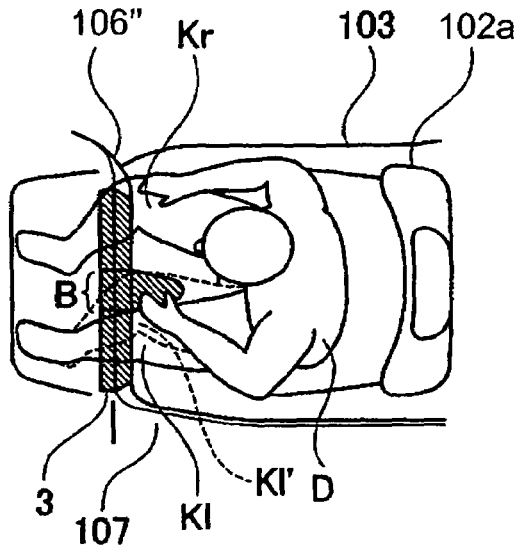
FIG. 10(b) a diagrammatic top plan view of the driver sitting on the driver's seat of the vehicle equipped with the occupant restriction device in accordance with the third embodiment of the present invention after a prescribed time has elapsed since the offset collision of the vehicle.
Figure 10C:
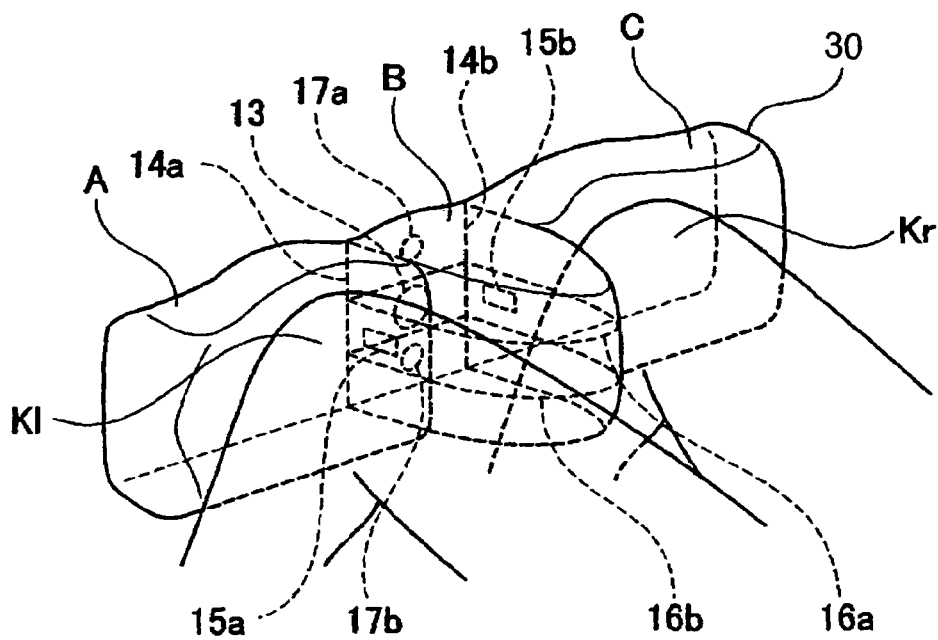
FIG. 10(c) is a diagrammatic view illustrating deformation of a shock absorbing body of the occupant restriction device in accordance with the third embodiment of the present invention when left and right kneecaps of the driver hit the shock absorbing body during the offset collision after more time has elapsed since the prescribed amount of time elapsed.

Referring now to FIGS. 10(a) to 10(c), the operation effects of the occupant restriction device 3 in accordance with the third embodiment will be explained. FIG. 10(a) is a top plan view illustrating the occupant restriction device 2 and a driver D sitting on the driver's seat 102a immediately after an offset collision occurs. FIG. 10(b) is a top plan view illustrating the occupant restriction device 2 and the driver D after a prescribed amount of time has elapsed since the offset collision occurred. FIG. 10(c) is a diagrammatic view illustrating deformation of the shock absorbing body 20 of the occupant restriction device 2 after more time has elapsed since the prescribed amount of time elapsed. FIGS. 10(a) to 10(c) illustrate an example of an offset collision in which the left side of the front of vehicle collides with the object O as seen in FIG. 3(c).

A driver D is sitting with a normal sitting posture when the vehicle is moving as seen in FIG. 10(a). When the offset collision occurs, the transverse center portion B of the shock absorbing body 30 of the occupant restriction device 3 is first inflated or deployed. At a point in time immediately after the offset collision, the transverse center portion B has entered between the left and right kneecaps Kl and Kr of the driver D as shown in FIG. 10(a).

Then, the legs of the driver D move to form the sitting posture shown in FIG. 10(b) due to the inertial force of the offset collision. More specifically, the left kneecap Kl of the driver D attempts to move toward right such that the legs of the driver D would form the closed leg sitting posture as indicated by the broken line Kl' in FIG. 10(b). However, the occupant restriction device 3 of the third embodiment is configured and arranged to prevent the legs of the driver D from forming the closed leg sitting posture. Since the transverse center portion B of the shock absorbing body 30 is configured and arranged to inflate or deploy early in the collision, the left kneecap Kl of the driver D hits a left side surface of the transverse center portion B. Since the rigidity of the transverse center portion B in the transverse direction of the vehicle is relatively high due to the inner membranes 16a and 16b, the left kneecap Kl of the driver D is supported by the transverse center portion B and prevented from approaching the right kneecap Kr of the driver D.

Then, after even more time has elapsed, the left and right kneecaps Kl and Kr engage with the left and right side portions A and C of the shock absorbing body 30 as shown in FIG. 10(c). The left and right side portions A and C are configured and arranged to deform while the internal pressures of the left and right side portions A and C support the left and right kneecaps Kl and Kr. The gas inside the left and right side portions A and C escape through the communication vents 15a and 15b and the upper and lower relief vents 17a and 17b. In other words, the left and right side portions A and C discharge the gas therein and shrink while the left and right side portions A and C support the left and right kneecaps Kl and Kr, respectively. Due to the shrinking of the left and right side portions A and C, the left and right side portions A and C are configured and arranged to absorb the impact energy as the left and right kneecaps Kl and Kr hit the left and right side portions A and C.

Referring now to FIGS. 11(a) to 11(c), the operation effects of the occupant restriction device 3 in accordance with the third embodiment when the driver D shifted the driver's seat 102a rearwardly will be explained. In such case, there are more space between the occupant restriction device 3 and the left and right kneecaps Kl and Kr of the driver D before the collision. FIG. 11(a) is a top plan view illustrating the occupant restriction device 3 and a driver D sitting on the driver's seat 102a immediately after an offset collision occurs. FIG. 11(b) is a top plan view illustrating the occupant restriction device 3 and the driver D after a prescribed amount of time has elapsed since the offset collision occurred. FIG. 11(c) is a diagrammatic view illustrating deformation of the shock absorbing body 30 of the occupant restriction device 3 after more time has elapsed since the prescribed amount of time elapsed. FIGS. 11(a) to 11(c) illustrate an example of an offset collision in which the left side of the front portion of the vehicle collides with an object O as seen in FIG. 3(c).

As shown in FIG. 11(a), the driver D is sitting with a normal sitting posture when the vehicle is moving. When the left side of the front portion of the vehicle collides with the object O as seen in FIG. 3(c), the inertial force of the offset collision causes the left and right kneecaps Kl and Kr of the driver D to attempt to move toward right. Since the driver's seat 102a is adjusted rearwardly and there is more space between the occupant restriction device 2 and the left and right kneecaps Kl and Kr of the driver D, the amount by which both kneecaps Kl and Kr move toward right is larger than in the case shown in FIGS. 10(a) to 10(c). Consequently, as shown in FIG. 11(a), even if the transverse center portion B is inflated or deployed early in the collision, the transverse center portion B cannot enter between the left and right kneecaps Kl and Kr of the driver D.

Consequently, as shown in FIG. 11(b), the left kneecap Kl of the driver D hits the transverse center portion B of the shock absorbing body 30. Thus, the sitting posture of the driver D becomes closer to the closed leg sitting posture than the case shown in FIGS. 10(a) to 10(c). The situation depicted in FIG. 11 is undesirable for the driver D and the shock felt by the driver D is larger than in the case shown in FIGS. 10(a) to 10(c). However, with the occupant restriction device 3 of the third embodiment of the present invention, the shock felt by the driver D is still substantially reduced comparing to the conventional occupant restriction device.

The interaction between the left and right kneecaps Kl and Kr of the driver D and the shock absorbing body 30 of the occupant restriction device 3 will now be described in more detail with reference to FIG. 11(c). First, the right kneecap Kr of the driver D hits the right side portion C of the shock absorbing body 30. The right side portion C is configured and arranged to discharge the internal gas therein and shrink to alleviate the impact force imparted to the right kneecap Kr of the driver D.

On the other hand, the left kneecap Kl of the driver D hits the transverse center portion B of the shock absorbing body 30 as seen in FIG. 11(c). As explained above, the rigidity of the transverse center portion B is adjusted by the inner membranes 16a and 16b such that the rigidity of the transverse center portion B is increased by the inner membranes 16a and 16b. However, the rigidity of the transverse center portion B in the longitudinal direction of the vehicle is arranged to be lower than the rigidities of the left and right side portions A and C because the upper and lower relief vents 17a and 17b are provided in the rear surface of the transverse center portion B.

Thus, the transverse center portion B is configured and arranged to receive the left kneecap Kl of the driver D even more resiliently than the left and right side portions A and C. Therefore, the transverse center portion B is configured and arranged to substantially reduce the shock felt by the driver D even when the sitting posture of the driver D is closer to the closed leg sitting posture.

When the rigidity of the transverse center portion B in the longitudinal direction of the vehicle is set to be relatively low, there is a concern that the left kneecap Kl might push through and contact the dashboard 106" without the impact being sufficiently alleviated. However, in the occupant restriction device 3 of the third embodiment, such an adverse situation does not occur because the transverse center portion B is configured and arranged to be inflated or deployed to protrude toward inside the cabin so that the distance over which shock can be absorbed in the longitudinal direction is set to be relatively long.

Accordingly, with the occupant restriction device 3 of the third embodiment, in a case where the left kneecap Kl of the driver D hits the transverse center portion B, the shock felt by the driver D can be substantially reduced even if the legs of the driver D are closer together than in the example shown in FIGS. 10(a) to 10(c). Thus, sufficient restriction of the occupant can be accomplished even when the left and right kneecaps Kl and Kr of the driver D do not move to the anticipated locations during the collision.

Similarly to the second embodiment, the occupant restriction device 3 in accordance with the third embodiment is configured and arranged to prevent the occupant from forming a closed leg sitting posture. Thus, the occupant restriction device 3 can deliver a stable effect of alleviating the impact to the kneecaps of the occupant.

Furthermore, with the third embodiment of the present invention, since the transverse center portion B of the shock absorbing body 30 is arranged to protrude beyond the left and right side portions A and C, the transverse center portion B is configured and arranged to intervene more readily between the left and right kneecaps Kl and Kr of the driver D and can reliably restrict the lateral (transverse) movement of the left and right kneecaps Kl and Kr of the driver D. As a result, the legs of the driver D is easier to be kept in the open leg sitting posture.

The shock absorbing body 30 of the third embodiment is configured and arranged such that after the shock absorbing body 30 is inflated or deployed, the transverse rigidity of the protruding transverse center portion B is higher than the transverse rigidities of the left and right side portions A and C, and the longitudinal rigidity of the protruding transverse center portion B is lower than the longitudinal rigidities of the left and right side portions A and C. Since the longitudinal rigidity of the transverse center portion B is lower than that of the left and right side portions A and C, the capacity of the transverse center portion B to absorb the shock resulting from being hit straight on in the forward direction of the vehicle is larger than that of the left and right side portions A and C. On the other hand, since the transverse rigidity of the transverse center portion B is higher than the transverse rigidities of the left and right portions A and C, the transverse center portion B is configured and arranged hold the legs of the driver D moderately open in a favorable manner.

Thus, while the occupant restriction device 3 of the third embodiment is configured and arranged to increase the effect of holding the legs of the driver D moderately open, the occupant restriction device 3 is also configured and arranged to receive one of the left and right kneecaps Kl and Kr of the driver D softly or resiliently when the one of the left and right kneecaps Kl and Kr hits the transverse center portion B. In short, the occupant restriction device 3 is configured and arranged to protect the occupant in a favorable manner while increasing the effect of holding the occupant's legs moderately open.

Since the shock absorbing body 30 of the occupant restriction device 3 is made of a bag-like body that is inflated or deployed after the collision, the occupant restriction device 3 can be manufactured using conventional knee air bag manufacturing technology. Consequently, the occupant restriction device 3 can be manufactured simply and inexpensively.

Furthermore, the rigidity of the shock absorbing body 30 is adjusted by providing the reinforcing inner membranes 16a and 16b inside the bag-like (inflatable) body of the shock absorbing body 30. Thus, the shock absorbing body 30 is light in weight and the rigidity of the shock absorbing body 30 can be adjusted inexpensively.

The shock absorbing body 30 of the third embodiment is configured and arranged such that the transverse center portion B is inflated or deployed earlier than the left and right side portions A and C, and the transverse center portion B protrudes beyond the left and right side portions A and C toward inside the cabin after the shock absorbing body 30 has inflated or deployed. Thus, the left or right kneecap Kl or Kr of the driver D is more likely to hit the side surface of the transverse center portion B that is inflated or deployed earlier, and thus, the occupant can be reliably protected.

Fourth Embodiment

Figure 12A:
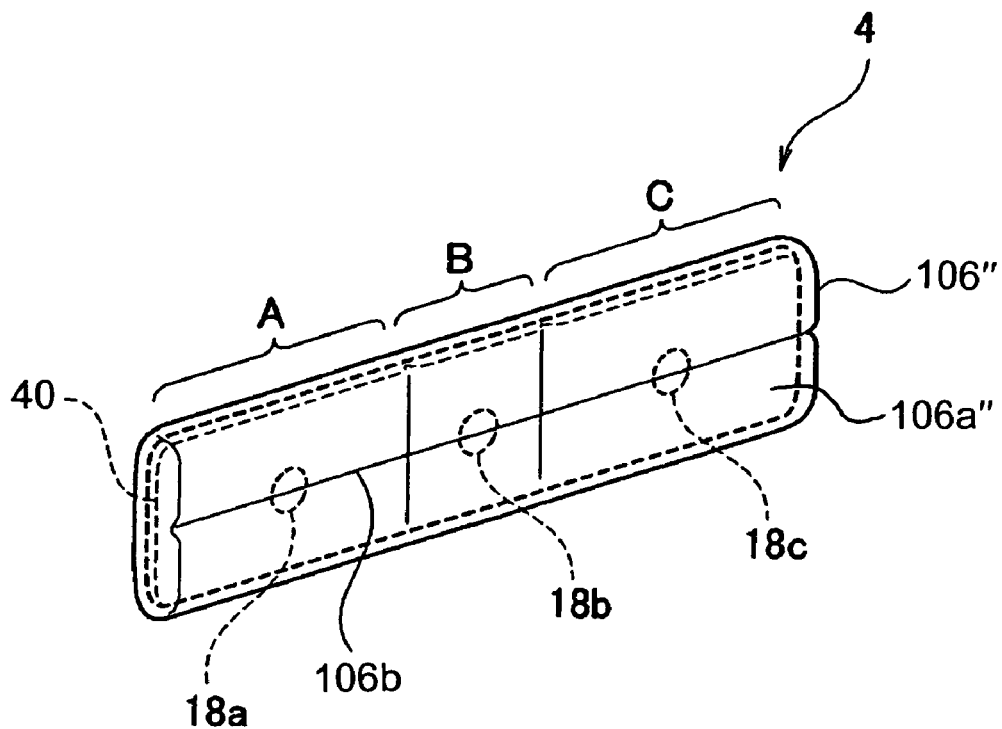
FIG. 12(a) is a perspective view of an occupant restriction device covered by a dashboard of the vehicle in accordance with a fourth embodiment of the present invention when a shock absorbing body of the occupant restriction device is in a stored state.
Figure 12B:
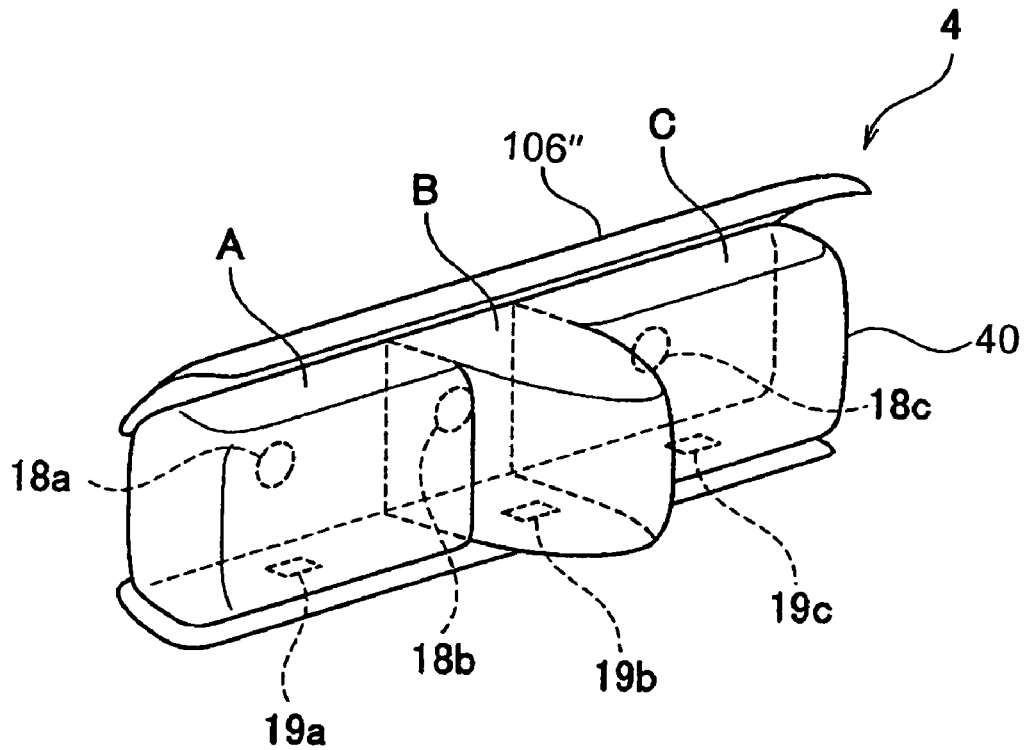
FIG. 12(b) is a perspective view of the occupant restriction device illustrated in FIG. 12(a) in accordance with the fourth embodiment of the present invention when the shock absorbing body of the occupant restriction device is in a deployed state to protect an occupant during a collision of the vehicle.

Referring now to FIGS. 12(a) and 12(b), an occupant restriction device 4 in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity. The parts of the fourth embodiment that differ from the parts of the third embodiment will be indicated with a triple prime ("').

The occupant restriction device 4 in accordance with the fourth embodiment is basically identical to the occupant restriction device 3 in accordance with the third embodiment except that a shock absorbing body 40 of the occupant restriction device 4 is divided into the transverse center portion B and the left and right side portions A that are not fluidly communicated to each other. Moreover, the transverse center portion B of the shock absorbing body 40 of the fourth embodiment is not provided with the inner membranes as in the shock absorbing body 30 of the third embodiment.

FIG. 12(a) is a perspective view of the occupant restriction device 4 in accordance with the fourth embodiment of the present invention in a stored state. FIG. 12(b) is a perspective view of occupant protecting device 4 in a deployed state in which the shock absorbing body 40 is deployed to protect an occupant during a collision.

Although the shock absorbing body 30 in accordance with the third embodiment explained above is configured and arranged to form a single gas chamber, the shock absorbing body 40 in accordance with the fourth embodiment is configured such that the inside of the shock absorbing body 40 is divided into a plurality of separate gas chambers, i.e., individually inflatable bodies or bags with individually adjustable deployment pressures. More specifically, as shown in FIGS. 12(a) and 12(b), each of the left and right side portions A and C and the transverse center portion B of the shock absorbing body 40 is preferably configured and arranged to form an independent gas chamber.

The shock absorbing body 40 preferably includes a plurality of inflators 18a to 18c, each of which is installed on the rear surfaces of the left side portion A, the transverse center portion B, and the right side portion C, respectively. The inflators 18a to 18c are configured and arranged to introduce gas into the left side portion A, the transverse center portion B, and the right side portion C to inflate or deploy the left side portion A, the transverse center portion B, and the right side portion C, respectively. The rigidity of inflatable bodies or portions A to C can be individually adjusted by adjusting the deployment pressures of the inflators 18a to 18c, respectively. Similarly to the third embodiment explained above, when the gas enters the left and right portions A and C and the transverse center portion B, the shock absorbing body 40 is configured and arranged to tear the groove 106b provided in the outer resin 106a" of the dashboard 106" to be inflated or deployed. Once the shock absorbing body 40 has been inflated or deployed, the left and right side portions A and C are configured and arranged to form cuboid or rectangular parallelepiped shapes, and the transverse center portion B is configured and arranged to form a wedge-like shape that protrudes beyond the left and right side portions A and C toward inside of the cabin.

Moreover, the left side portion A, the transverse center portion B, and the right side portion C are also provided with relief vents 19a, 19b and 19c, respectively. More specifically, the relief vents 19a to 19c are provided on the bottom surfaces of left side portion A, the transverse center portion B, and the right side portion C. The left side portion A, the transverse center portion B, and the right side portion C are configured to absorb the impact energy of the left and right kneecaps Kl and Kr of the occupant by gradually releasing pressure through the relief vents 19a, 19b and 19c, respectively.

With the shock absorbing body 40, a discharge pressure of the inflator 18b of the transverse center portion B is preferably set higher than discharge pressures of the inflators 18a and 18c of the left and right side portions A and C. Thus, similarly to the third embodiment, the transverse center portion B is configured and arranged to be inflated or deployed earlier than the left and right side portions A and C, and the rigidity of the transverse center portion B is higher than the rigidities of the left and right side portions A and C. In this way, the rigidity of each of the left side portion A, the transverse center portion B, and the right side portion C of the shock absorbing body 40 is adjusted individually by adjusting the pressure of the gas at the time of inflation or deployment.

Moreover, the relief vent 19b of the transverse center portion B preferably has a larger opening area than the relief vents 19a and 19c of the left and right side portions A and C. Therefore, if one of the left and right kneecaps Kl and Kr of the occupant hits the transverse center portion B, the gas inside the transverse center portion B can escape rapidly through the relief vent 19b.

Thus, regarding the longitudinal direction of the vehicle, the rigidity of the transverse center portion B is lower in the longitudinal direction than the rigidity of the left and right side portions A and C because the gas escapes rapidly through the relief vent 19b with the larger opening when one of the left and right kneecaps Kl and Kr hits the transverse center portion B. On the other hand, regarding the transverse direction of the vehicle, consider a case in which first the right kneecap Kr of the occupant hits the right side portion C and the left kneecap Kl hits the left side portion A, and then the left and right kneecaps Kl and Kr move toward right. In such case, the gases inside the left and right side portions A and C escape through the relief vents 19a and 19c, respectively, to some extent due to the contact with the left and right kneecaps Kl and Kr. If the transversely oriented acceleration of the vehicle is generated in the offset collision and if the transversely oriented acceleration causes the left kneecap Kl to hit the side surface of the transverse center portion B, the transverse center portion B is configured and arranged to fold slightly toward right readily because some of the gas in the right side portion C has been released. Since the transverse center portion B is first configured and arranged to fold over when a force acts on the side surface thereof, the transverse center portion B is configured and arranged to substantially maintain its original shape (wedge-like shape) at the time of inflation or deployment. In other words, the shock absorbing body 40 is configured and arranged such that the transverse rigidity of the transverse center portion B is effectively higher than the transverse rigidity of the left and right side portions A and C.

Accordingly, the transverse center portion B of the shock absorbing body 40 has a relatively low rigidity in the longitudinal direction of the vehicle and is configured to alleviate the impact when one of the left and right kneecaps Kl and Kr hits the transverse center portion B during a collision by rapidly releasing pressure from the relief vent 19b. On the other hand, since the transverse center portion B of the shock absorbing body 40 is configured and arranged to have a relatively high rigidity in the transverse direction, the shock absorbing body 40 is configured and arranged to prevent the legs of the occupant from forming the closed leg sitting posture.

Similarly to the third embodiment, the occupant restriction device 4 in accordance with the fourth embodiment is configured and arranged to prevent the occupant from forming a closed leg sitting posture. Thus, the occupant restriction device 4 can deliver a stable effect of alleviating the impact to the kneecaps of the occupant.

Additionally, the occupant restriction device 4 of the fourth embodiment is configured and arranged to increase the effect of holding the occupant's legs moderately open to protect the occupant in a favorable manner. Also, the occupant restriction device 4 can be manufactured simply and inexpensively while the occupant restriction device 4 can protect the occupant reliably.

Furthermore, in the fourth embodiment, the inside of the shock absorbing body 40 is divided into a plurality gas chambers (the left side portion A, the transverse center portion B, and the right side portion C) and the rigidity of the individual chambers is adjusted by adjusting the pressure to which the chambers are inflated or deployed. Thus, the shock absorption effect or the shock alleviation effect can be optimized in accordance with the vehicle speed and the knee position of the occupant at the time of the collision.

Although the first to fourth embodiments are described regarding an example in which the vehicle undergoes an offset collision, the present invention exhibits similar effects in any collision in which the occupant's left and right kneecaps Kl and Kr move in the transverse direction of the vehicle. For example, in addition to offset collisions, the invention is also effective with respect to diagonal front collisions.

Although in the first and second embodiments, the rigidity of the shock absorbing body 10 or 20 that is made of thin sheet metal is adjusted by providing a plurality of slits in the shock absorbing body 10 or 20, the invention is not limited to such arrangement. For example, the rigidity of the shock absorbing body 10 or 20 can be adjusted by providing a rib or a plurality of ribs (reinforcing members) in the shock absorbing body 10 or 20. In such a case, a similar effect to that achieved by providing the slits in the sheet metal can be obtained by using thinner sheet metal, thereby lowering the rigidity of the shock absorbing body 10 or 20 itself, and providing the rib or ribs in the transverse center portion B.

Figure 13:
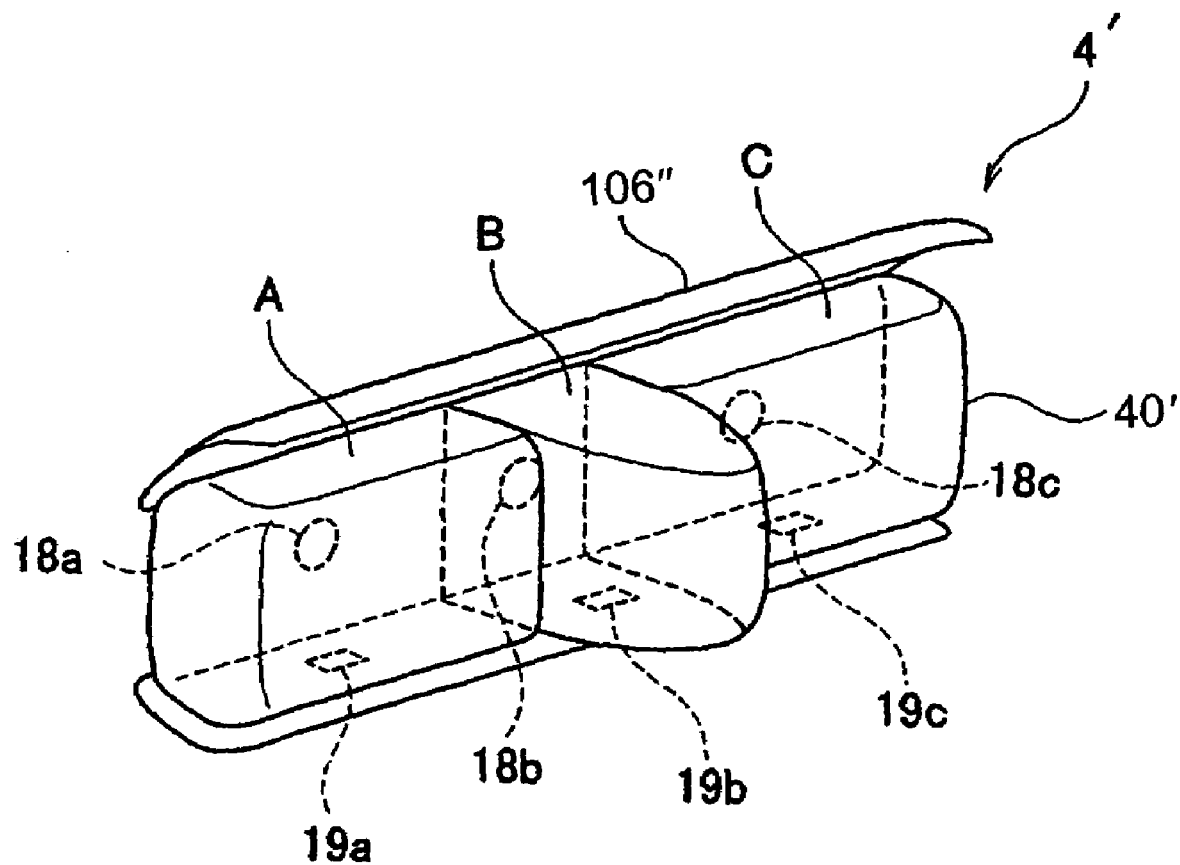
FIG. 13 is a perspective view of a modified occupant restriction device in accordance with the fourth embodiment of the present invention that is basically identical to the occupant restriction device illustrated in FIGS. 12(a) and 12(b) except that the shock absorbing body of the occupant restriction device has been formed by a plurality of inflatable bodies.

Although the fourth embodiment describes an example in which the inside of the shock absorbing body 40 is divided into a plurality of gas chambers (the left side portion A, the transverse center portion B, and the right side portion C) and the pressure of each of the individual gas chambers is adjusted to adjust the rigidity of the left side portion A, the transverse center portion B, and the right side portion C, the invention is not limited to such arrangement. For example, as seen in FIG. 13, an occupant restriction device 4' can be formed by a plurality of separate, individual inflatable bodies or air bags corresponding to the left side portion A, the transverse center portion B, and the right side portion C so that the inflatable bodies collectively form a shock absorbing body 40'. In such a case too, the shock absorption effect and the shock alleviation effect of the shock absorbing body 40' can be optimized in accordance with the vehicle speed and the knee position of the occupant at the time of the collision.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-381522. The entire disclosure of Japanese Patent Application No. 2003-381522 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An occupant restriction device comprising:
   a left side shock absorbing portion configured and arranged to be installed inside a cabin of a vehicle to be disposed generally in front of a left kneecap of an occupant when the occupant sits on a front occupant seat;
   a right side shock absorbing portion configured and arranged to be installed in inside the cabin of the vehicle to be disposed generally in the front of a right kneecap of the occupant when the occupant sits on the front occupant seat; and
   a transverse center shock absorbing portion disposed between the left and right side shock absorbing portions to form a shock absorbing body, the shock absorbing body including an inflatable body configured and arranged to be deployed toward inside the cabin of the vehicle, the shock absorbing body being arranged such that the transverse center shock absorbing portion protrudes farther toward inside the cabin of the vehicle than the left and right side shock absorbing portions.

2. The occupant restriction device as recited in claim 1, wherein
   the shock absorbing body is configured and arranged to be disposed in a lower portion of a dashboard of the vehicle.

3. The occupant restriction device as recited in claim 1, wherein
   the transverse center shock absorbing portion has a lower rigidity than the left and right side shock absorbing portions in a longitudinal direction of the vehicle.

4. The occupant restriction device as recited in claim 1, wherein
   the shock absorbing body comprises a plurality of inflatable bodies forming the left and right side shock absorbing portions and the transverse center shock absorbing portion of the shock absorbing body with the rigidity of each of the inflatable bodies being adjustable by adjusting deployment pressures of the inflatable bodies.

5. An occupant restriction device comprising:
   a left side shock absorbing portion conflaured and arranged to be installed inside a cabin of a vehicle to be disposed generally in front of a left kneecap of an occupant when the occupant sits on a front occupant seat;
   a right side shock absorbing portion configured and arranged to be installed in inside the cabin of the vehicle to be disposed generally in the front of a right kneecap of the occupant when the occupant sits on the front occupant seat; and
   a transverse center shock absorbing portion disposed between the left and right side shock absorbing portions to form a shock absorbing body with the transverse center shock absorbing portion of the shock absorbing body having a higher rigidity than the left and right side portions in a transverse direction of the vehicle, with the shock absorbing body including an inflatable body configured and arranged to be deployed toward inside the cabin of the vehicle.

6. The occupant restriction device as recited in claim 5, wherein
   the rigidity of the shock absorbing body is set by providing at least one reinforcing membrane inside the inflatable body.

7. An occupant restriction device comprising:
   left shock absorbing means for resiliently receiving a left kneecap of an occupant;
   right shock absorbing means for resiliently receiving a right kneecap of the occupant; and
   center shock absorbing means for preventing the left and right kneecaps of the occupant to form a closed leg sitting posture by being inflated and deployed farther toward inside a cabin of the vehicle than the left and right side shock absorbing means when the left and right kneecaps of the occupant move forwardly during a collision of a vehicle.

* * * * *